(12) United States Patent
Nakanishi et al.

(10) Patent No.: US 10,908,452 B2
(45) Date of Patent: Feb. 2, 2021

(54) OPTICAL ELEMENT

(71) Applicant: Japan Display Inc., Minato-ku (JP)

(72) Inventors: Takayuki Nakanishi, Tokyo (JP); Tatsuya Yata, Tokyo (JP); Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/168,996

(22) Filed: Oct. 24, 2018

(65) Prior Publication Data

US 2019/0129245 A1     May 2, 2019

(30) Foreign Application Priority Data

Oct. 27, 2017    (JP) ................................ 2017-208399

(51) Int. Cl.
| | | |
|---|---|---|
| *G02F 1/1335* | (2006.01) | |
| *G02F 1/1337* | (2006.01) | |
| *G02F 1/13363* | (2006.01) | |
| *G02F 1/1347* | (2006.01) | |

(52) U.S. Cl.
CPC ...... *G02F 1/133526* (2013.01); *G02F 1/1337* (2013.01); *G02F 1/1347* (2013.01); *G02F 1/13363* (2013.01); *G02F 1/133512* (2013.01); *G02F 1/133528* (2013.01); *G02F 1/133553* (2013.01); *G02F 2203/07* (2013.01); *G02F 2203/28* (2013.01)

(58) Field of Classification Search
CPC ......... G02F 1/133526; G02F 1/133512; G02F 1/133528; G02F 1/133553; G02F 1/13363; G02F 1/1337; G02F 1/1347; G02F 2203/07; G02F 2203/28
See application file for complete search history.

(56) References Cited

U.S. PATENT DOCUMENTS

| | | | |
|---|---|---|---|
| 2005/0243237 A1 | 11/2005 | Sasuga | |
| 2006/0098296 A1* | 5/2006 | Woodgate | ............ H04N 13/305 359/642 |
| 2006/0146202 A1* | 7/2006 | Ioki | ...................... H04N 13/302 348/739 |
| 2006/0152812 A1 | 7/2006 | Woodgate et al. | |
| 2006/0164593 A1 | 7/2006 | Peyghambarian et al. | |

FOREIGN PATENT DOCUMENTS

| | | |
|---|---|---|
| JP | 2005-317879 | 11/2005 |
| JP | 2006-516753 | 7/2006 |
| JP | 2007-264321 | 10/2007 |
| JP | 2007-535686 | 12/2007 |
| JP | 2008-529064 | 7/2008 |

\* cited by examiner

*Primary Examiner* — Nathanael R Briggs
(74) *Attorney, Agent, or Firm* — Oblon, McClelland, Maier & Neustadt, L.L.P.

(57) ABSTRACT

According to one embodiment, an optical element, including a first liquid crystal lens formed of liquid crystal molecules, a polarizer opposed to the first liquid crystal lens, a first modulating portion located between the first liquid crystal lens and the polarizer to modulate incident light and a first unmodulating portion located between the first liquid crystal lens and the polarizer and adjacent to the first modulating portion.

8 Claims, 22 Drawing Sheets

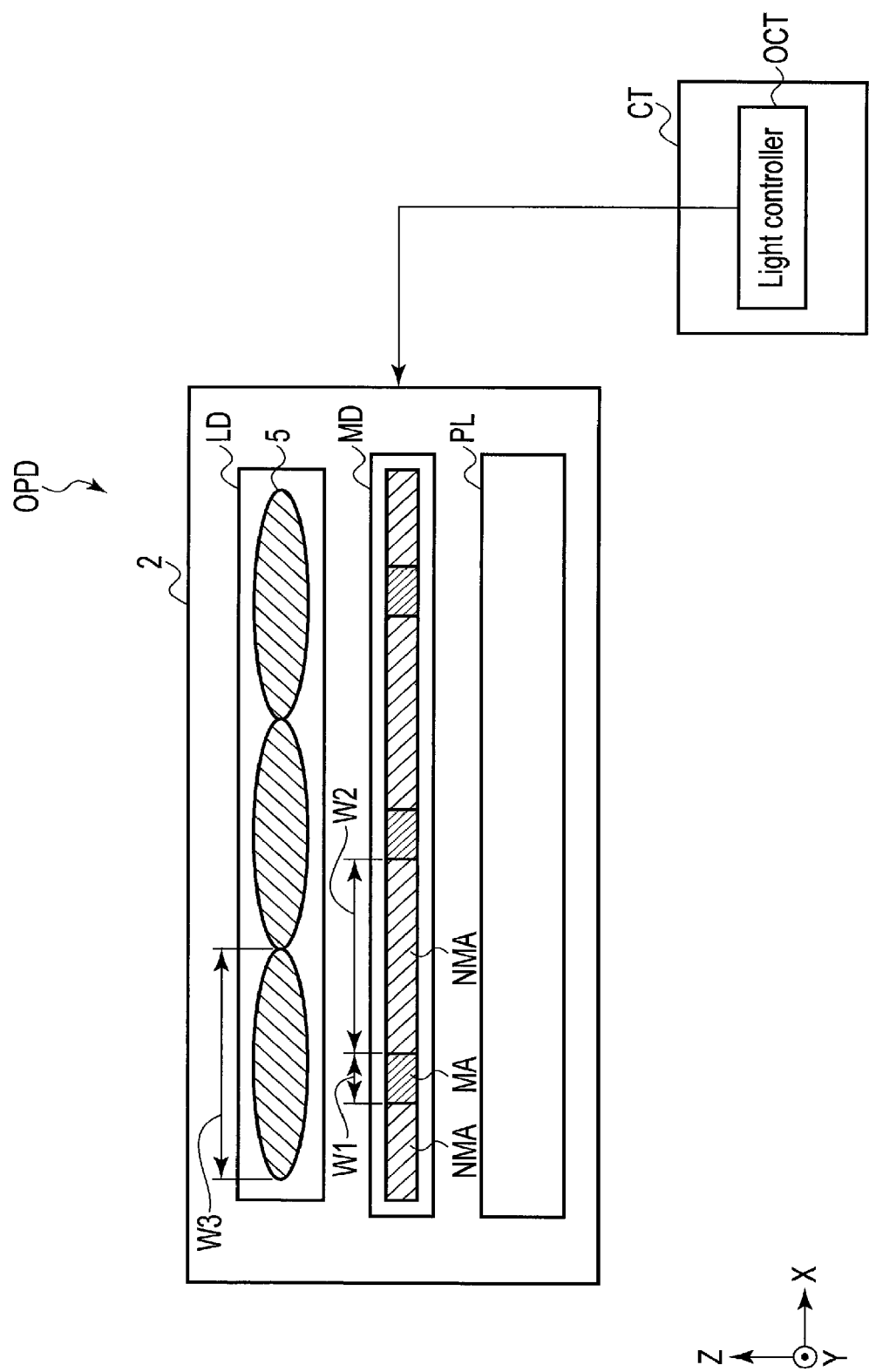
F I G. 1

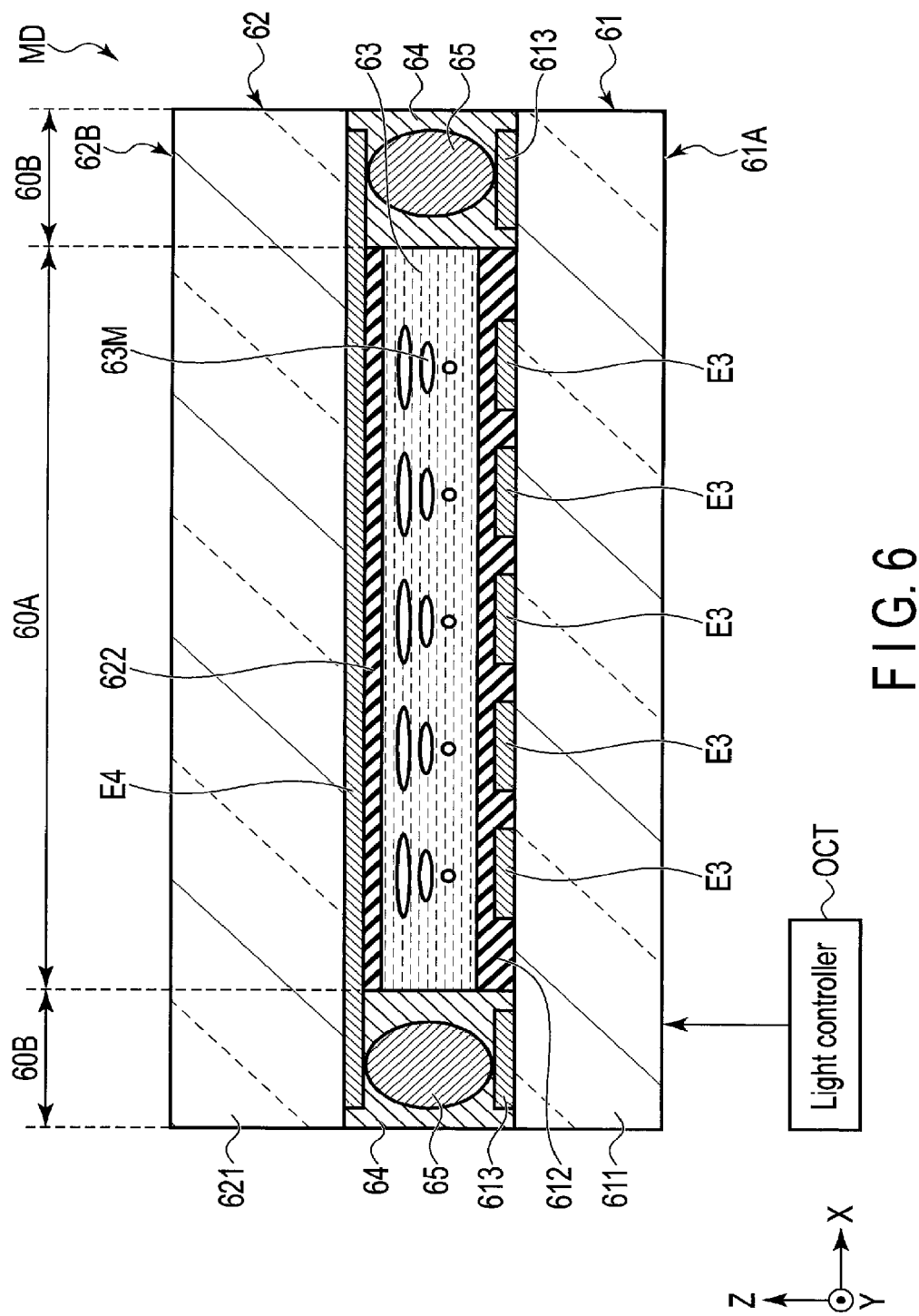
F I G. 6

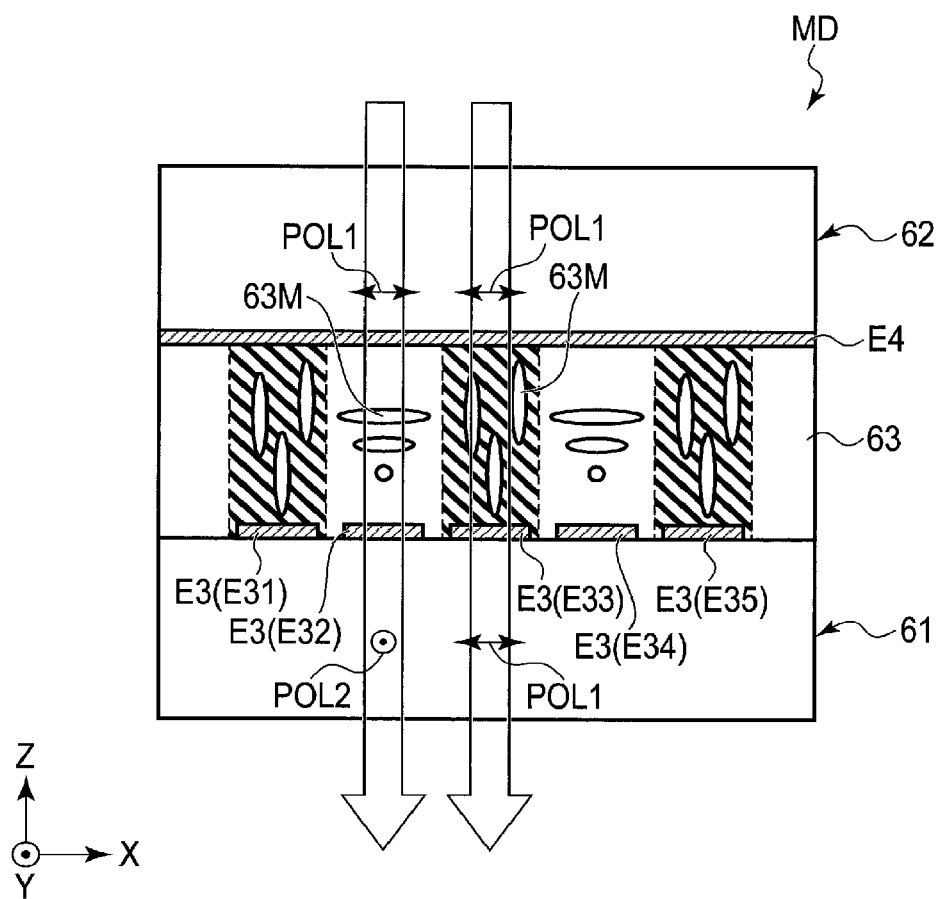
F I G. 7

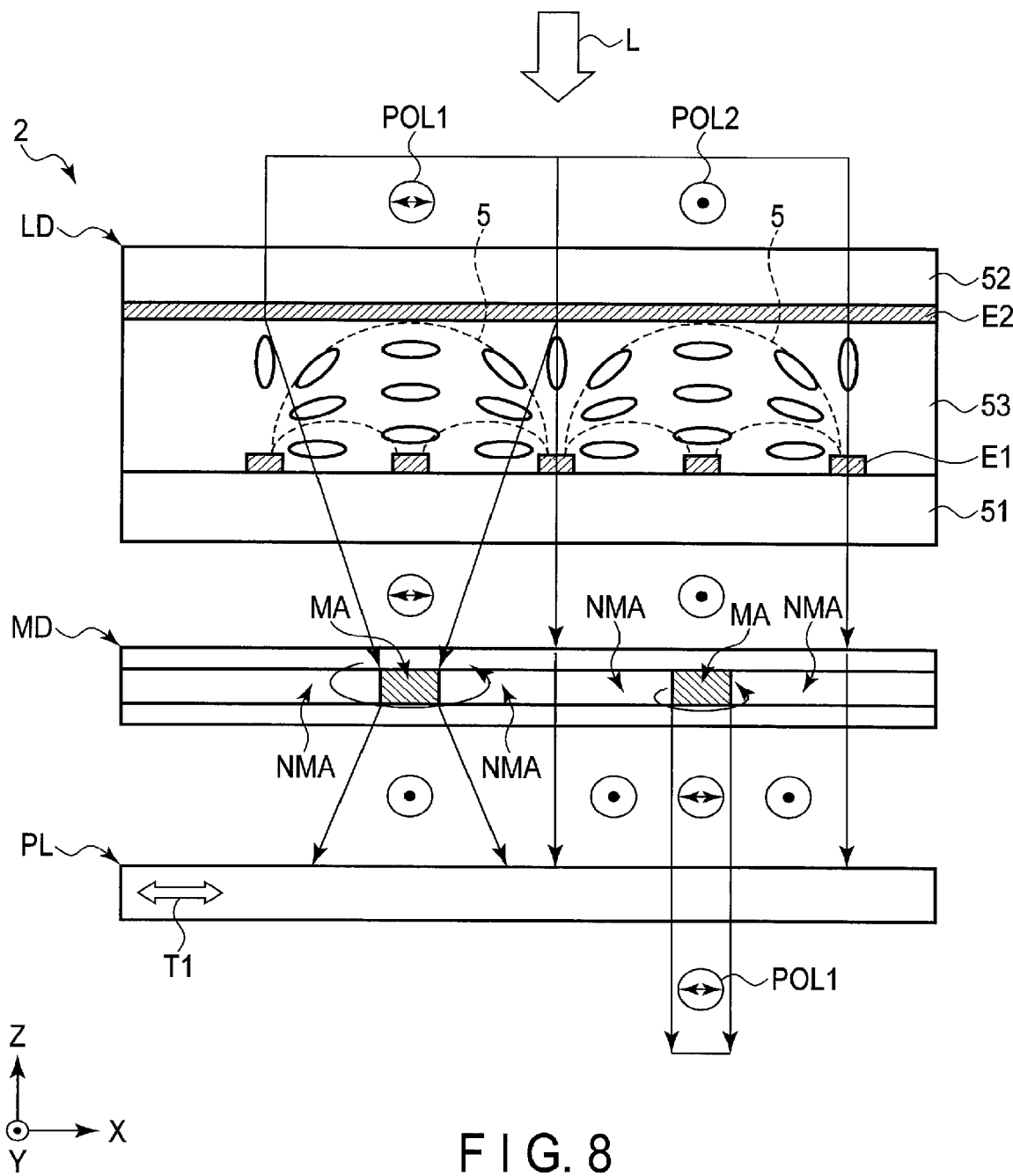
F I G. 8

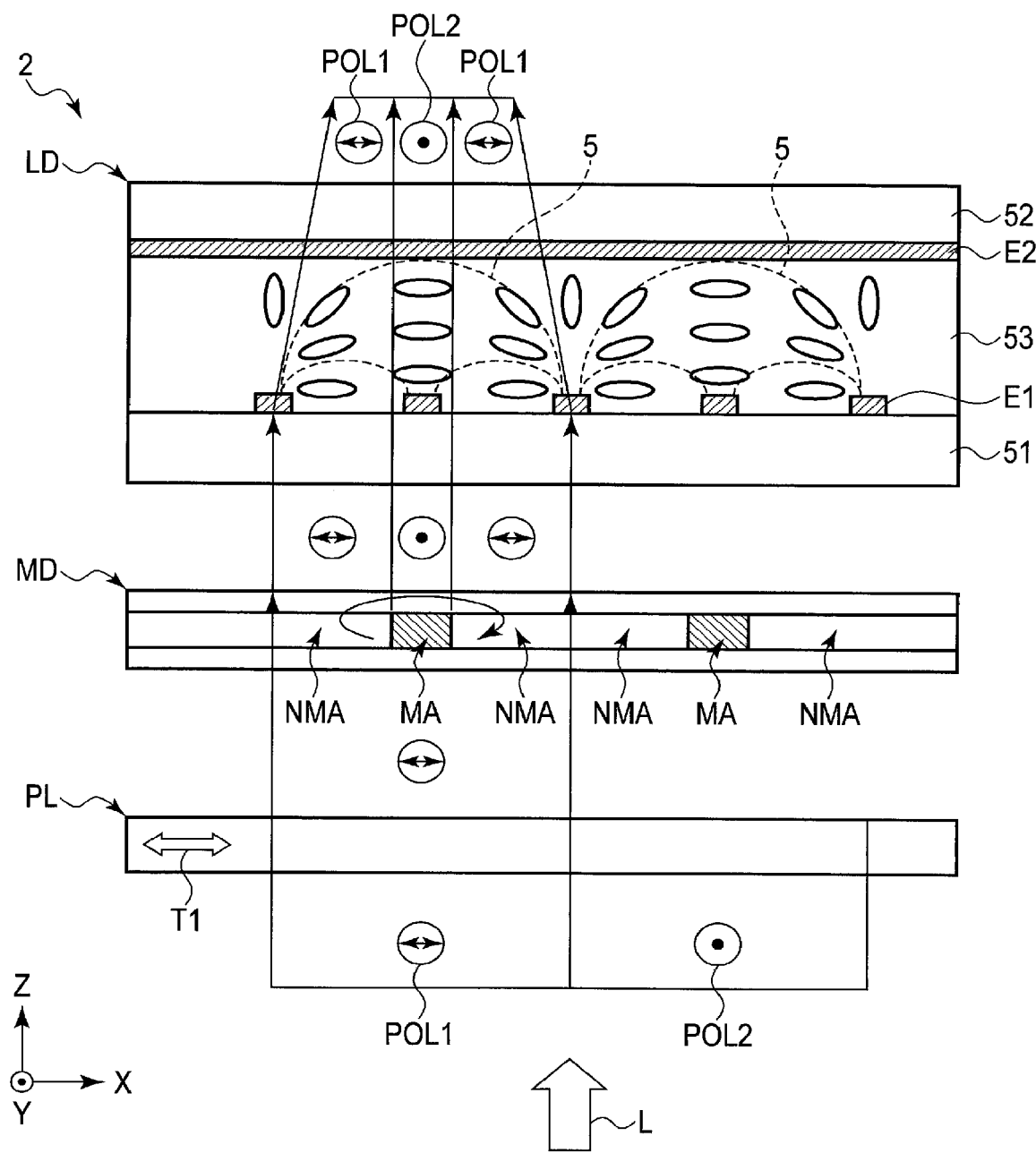
F I G. 9

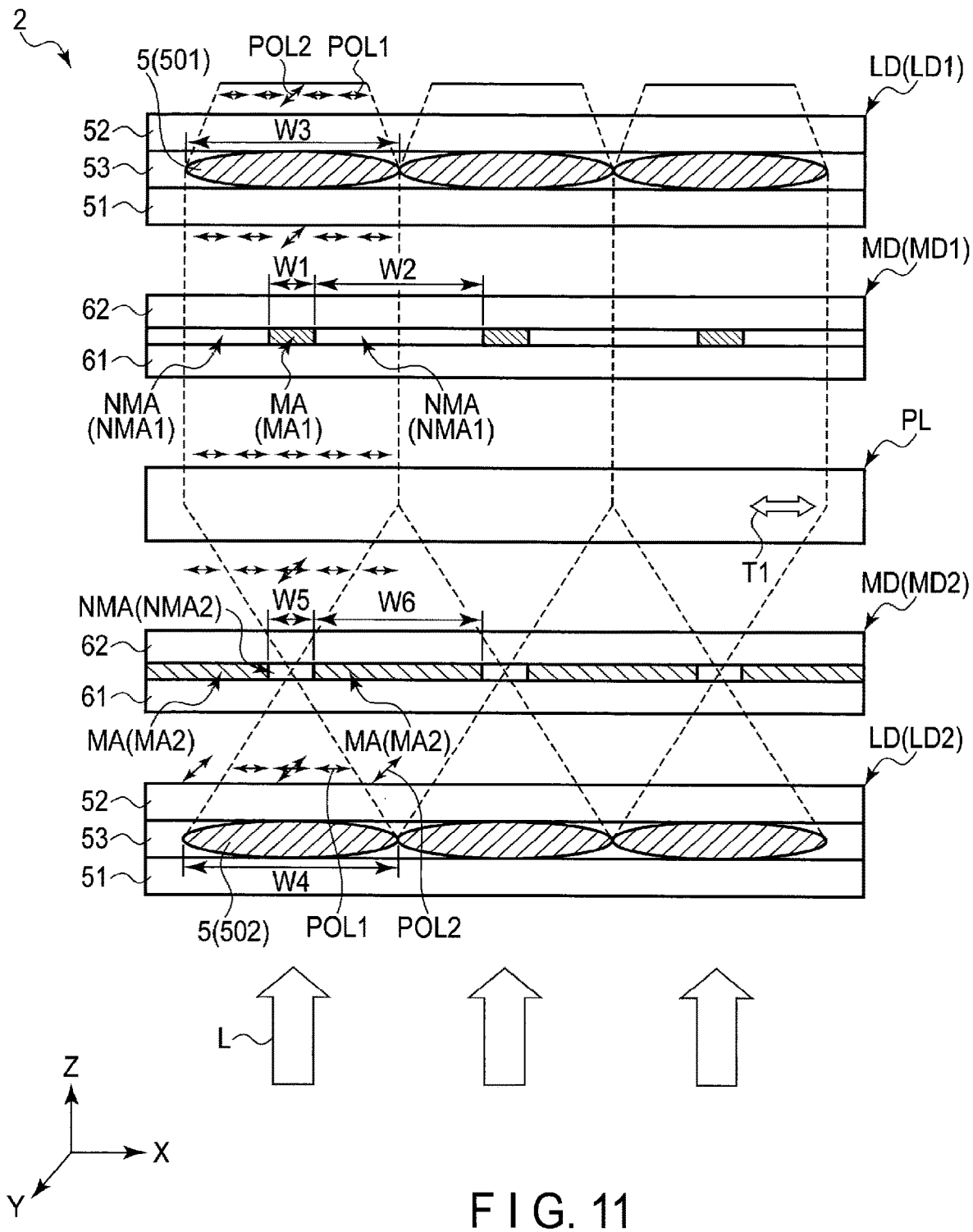
F I G. 11

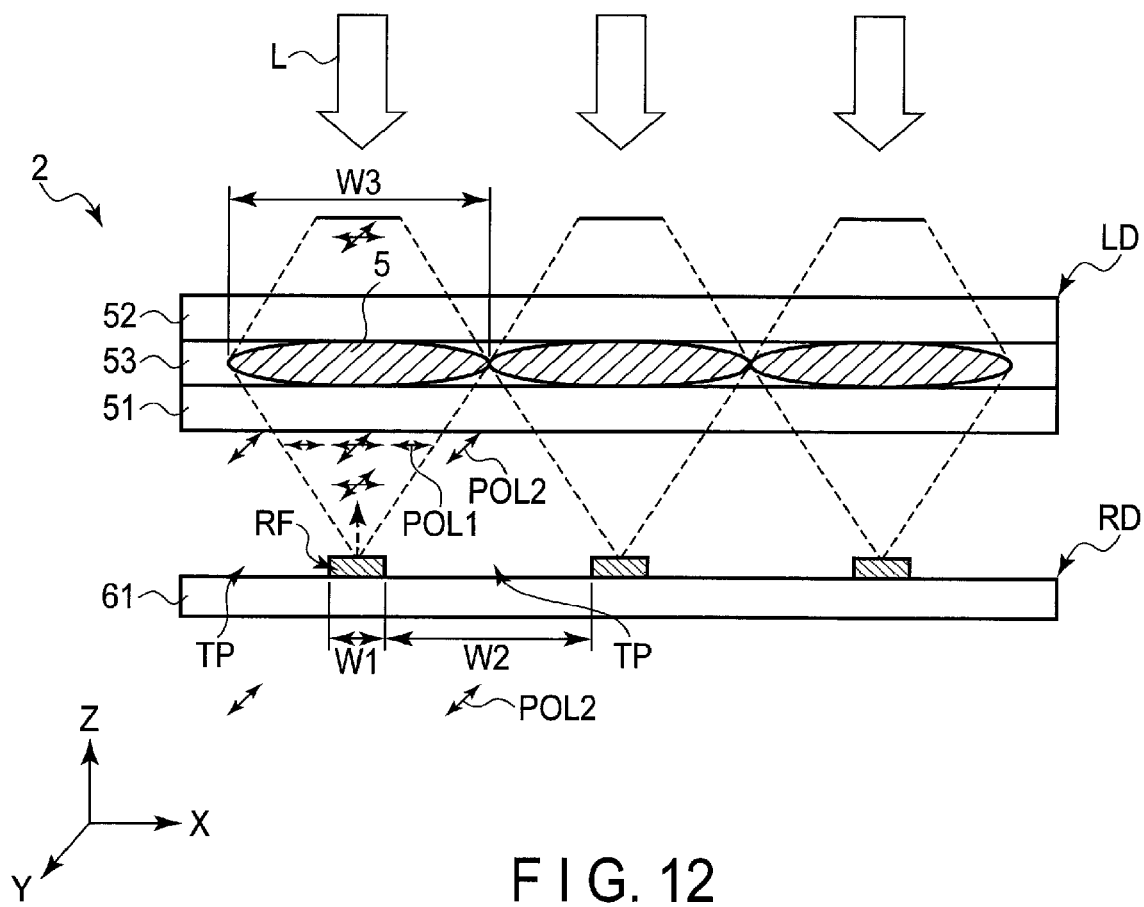
F I G. 12

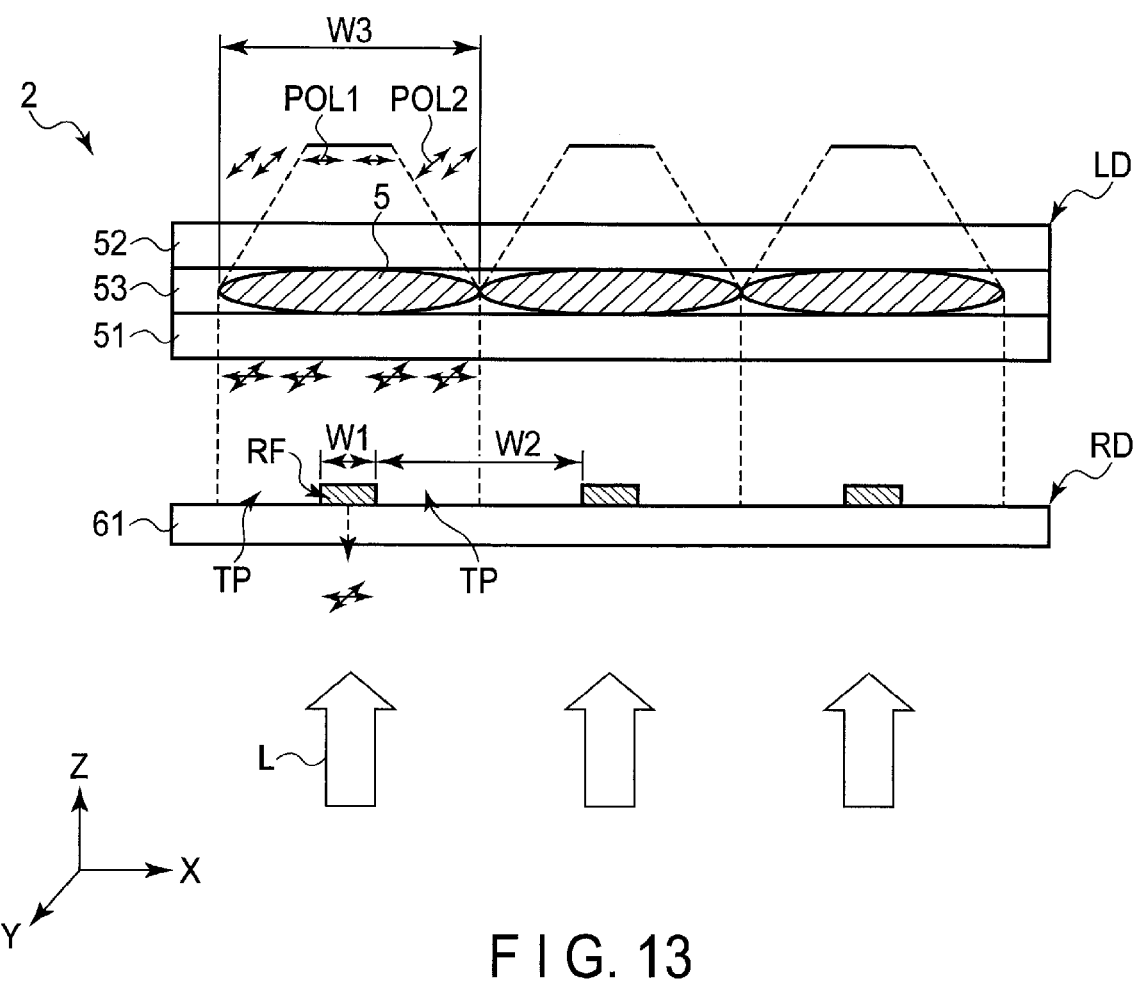
F I G. 13

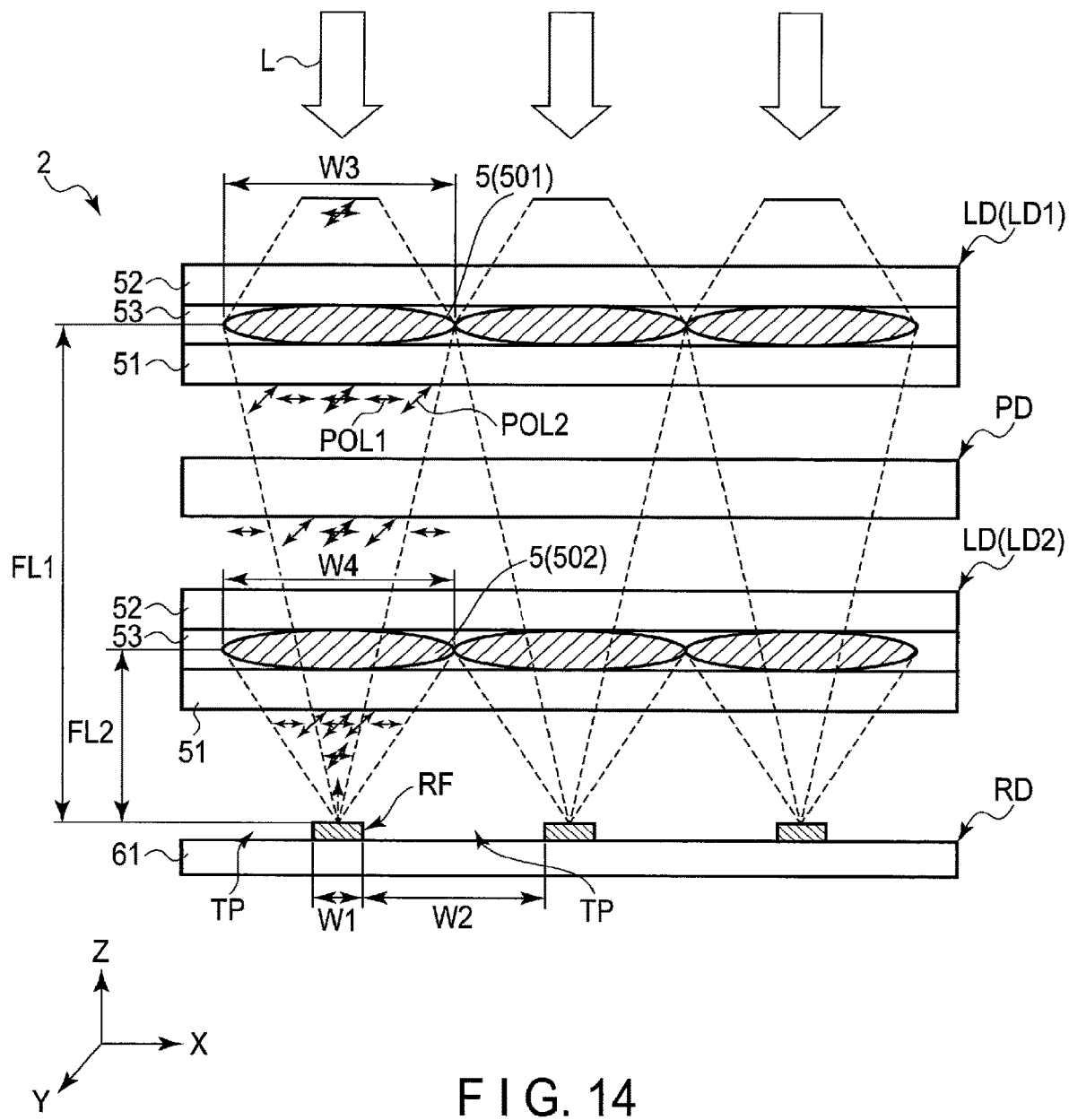
F I G. 14

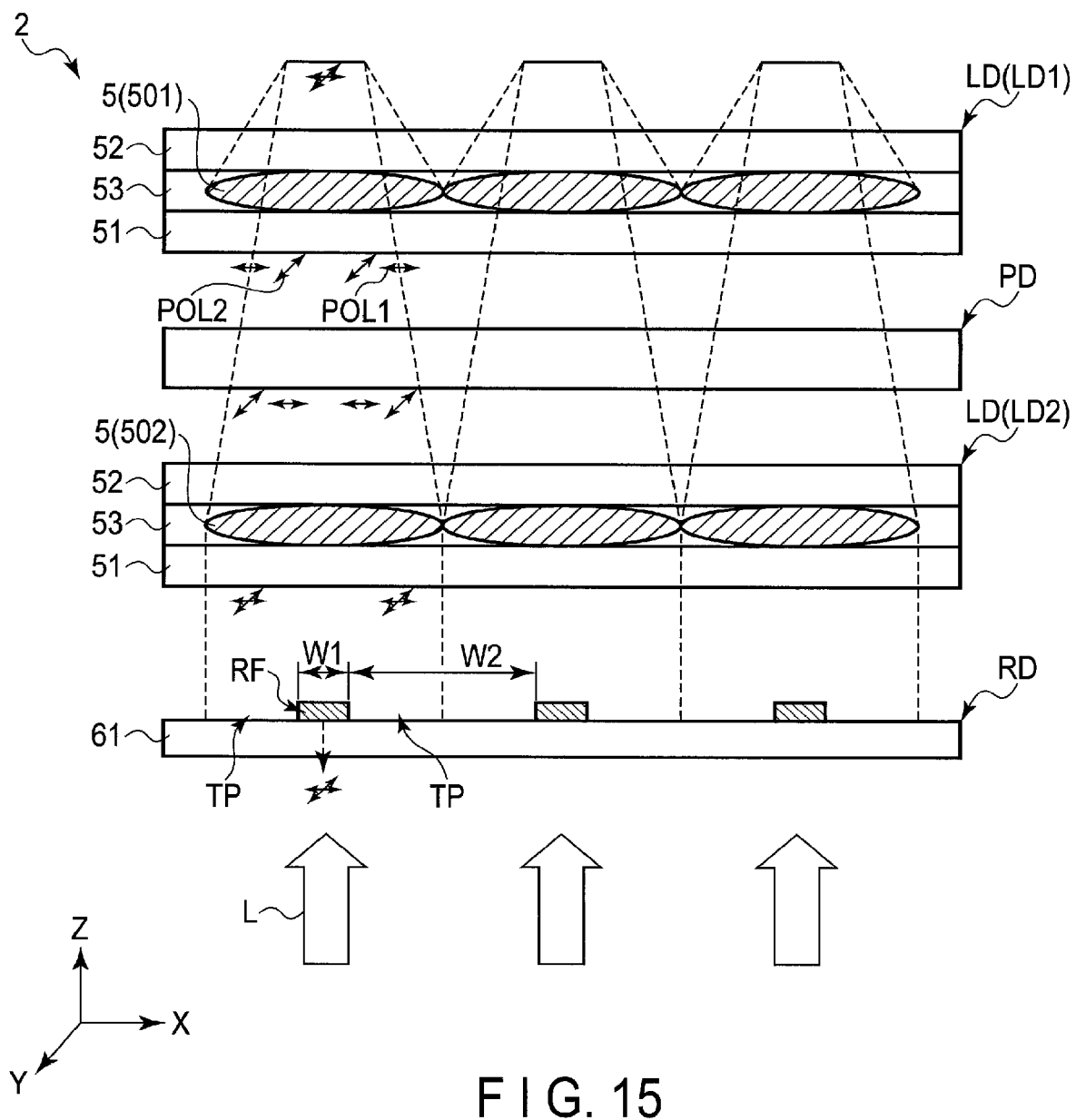
F I G. 15

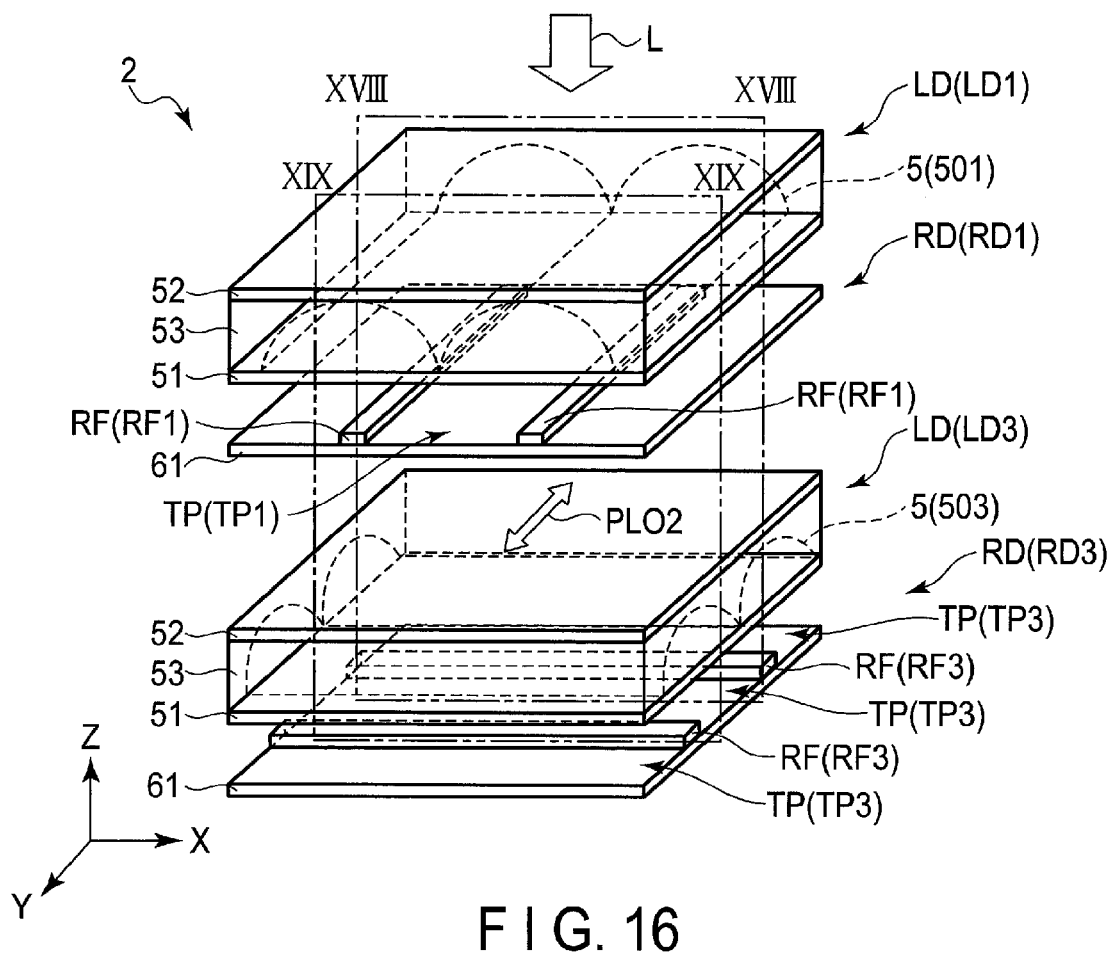
F I G. 16
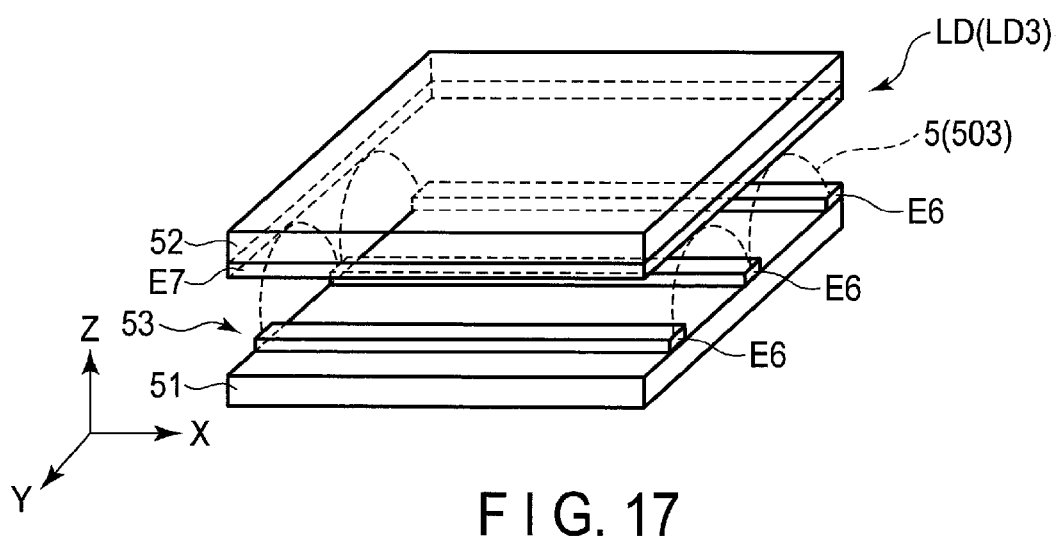
F I G. 17

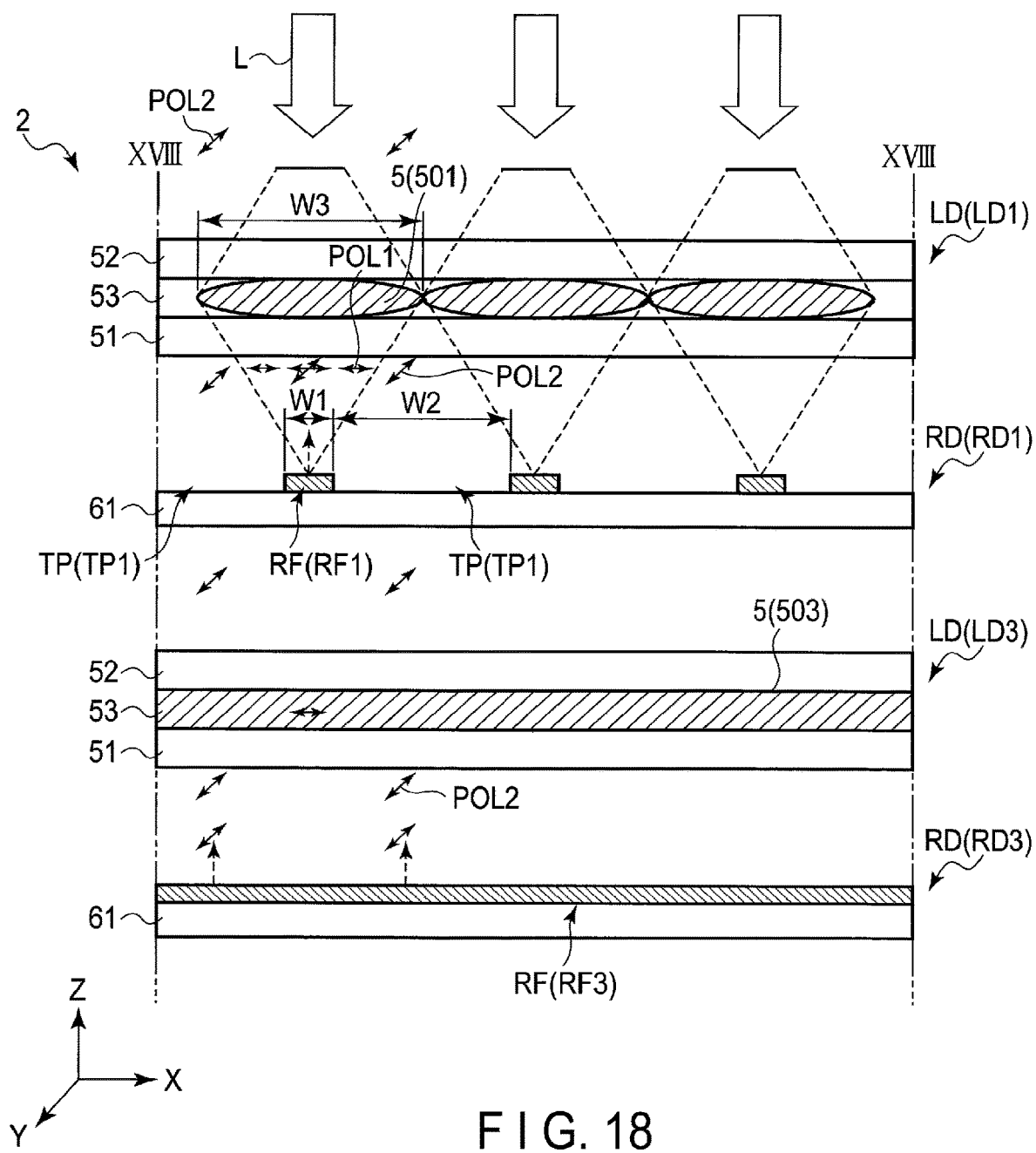
F I G. 18

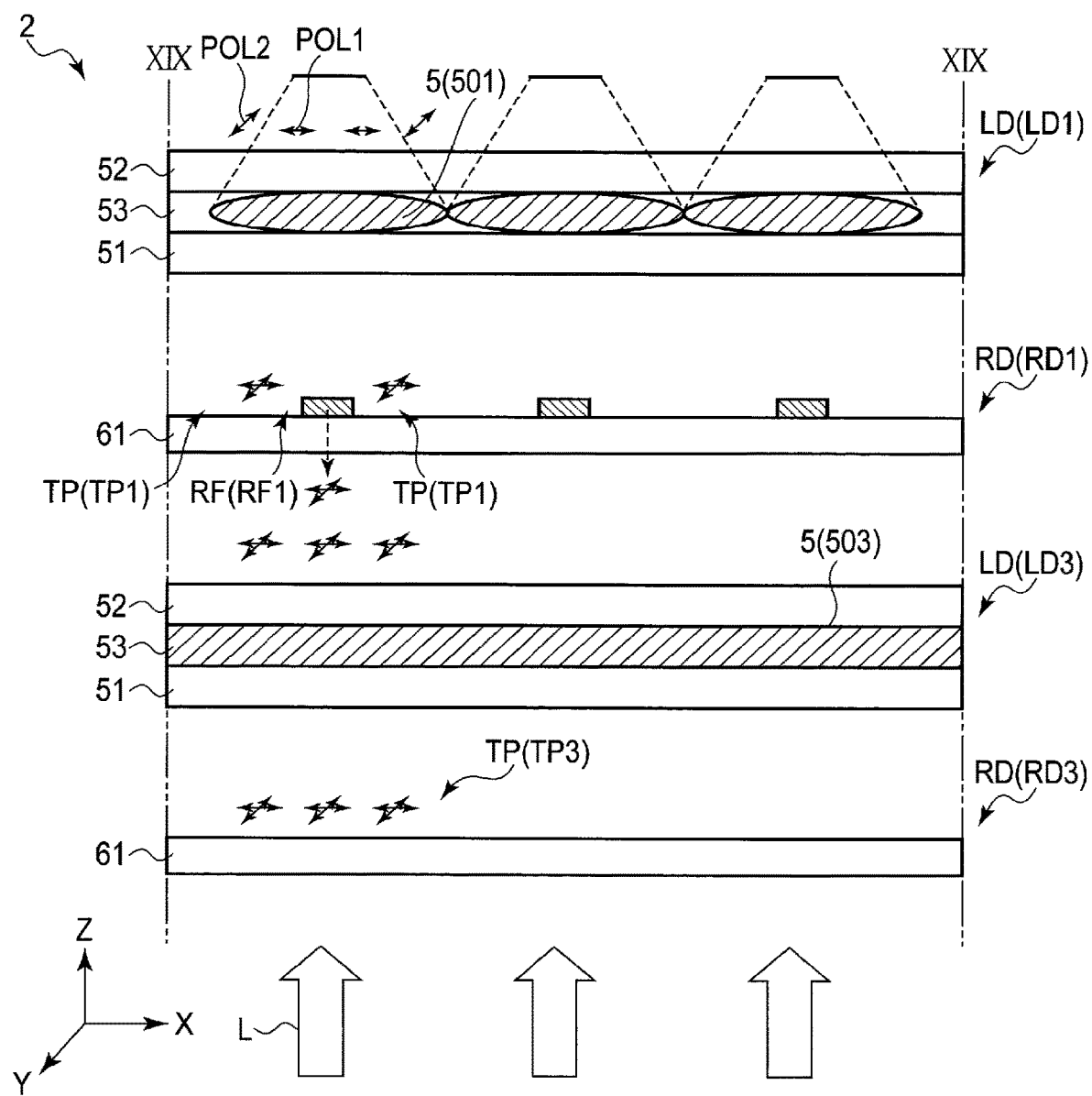
F I G. 19

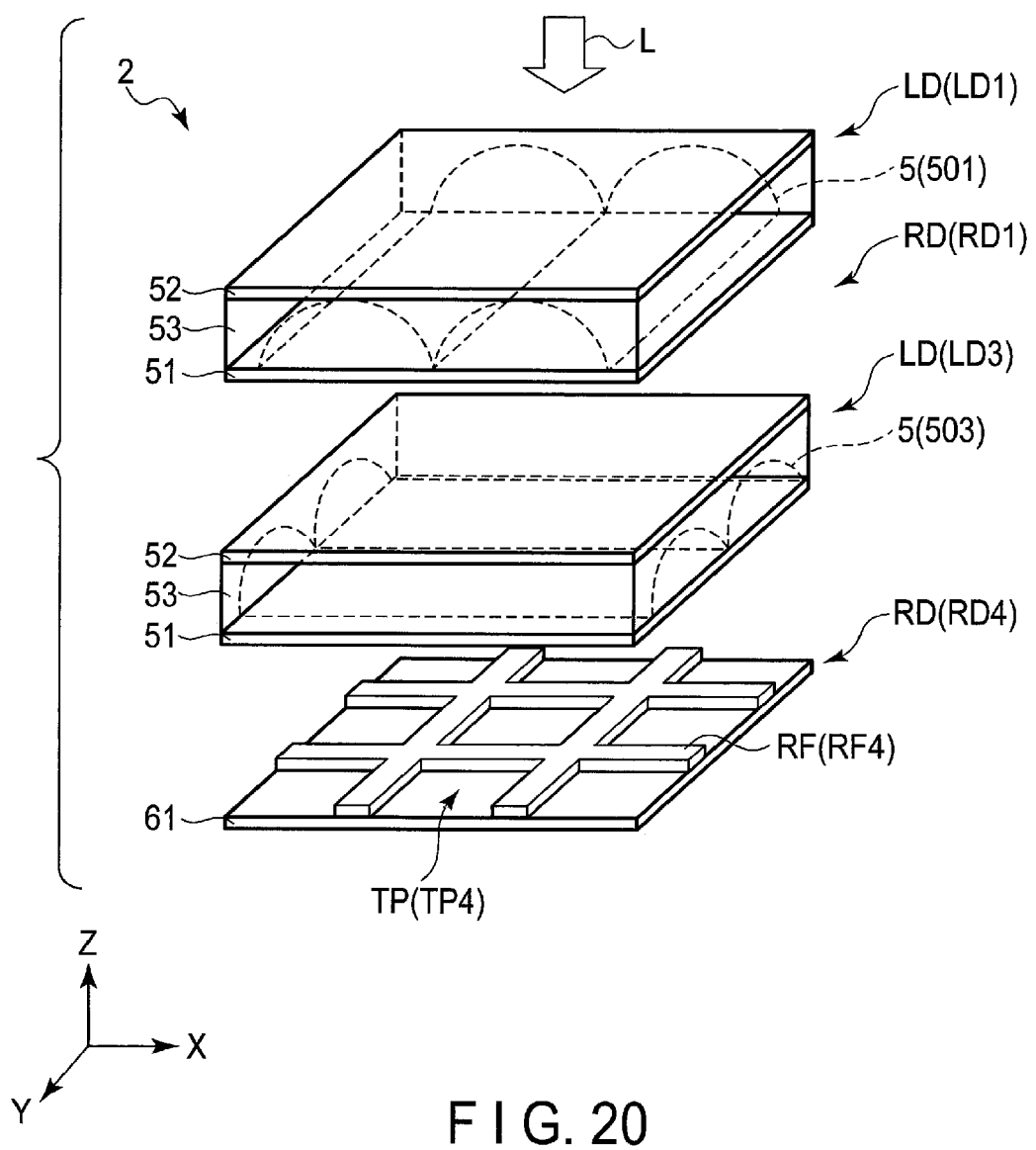
F I G. 20

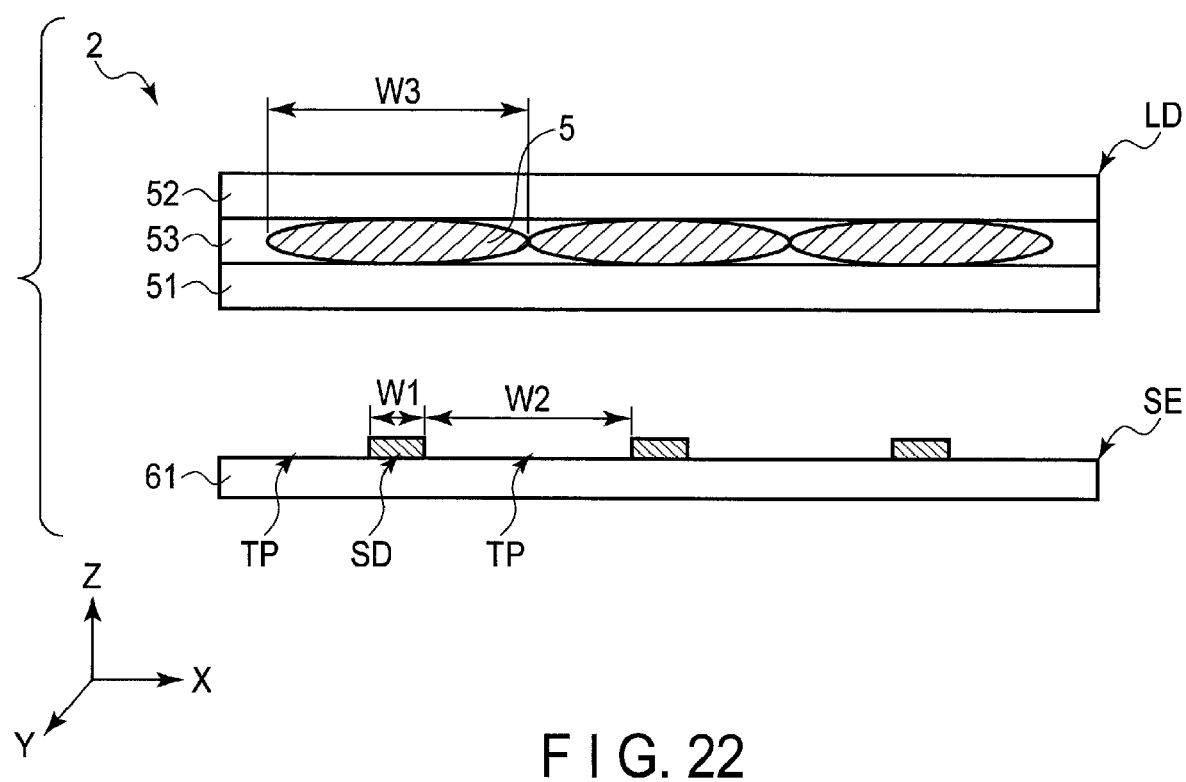
F I G. 22

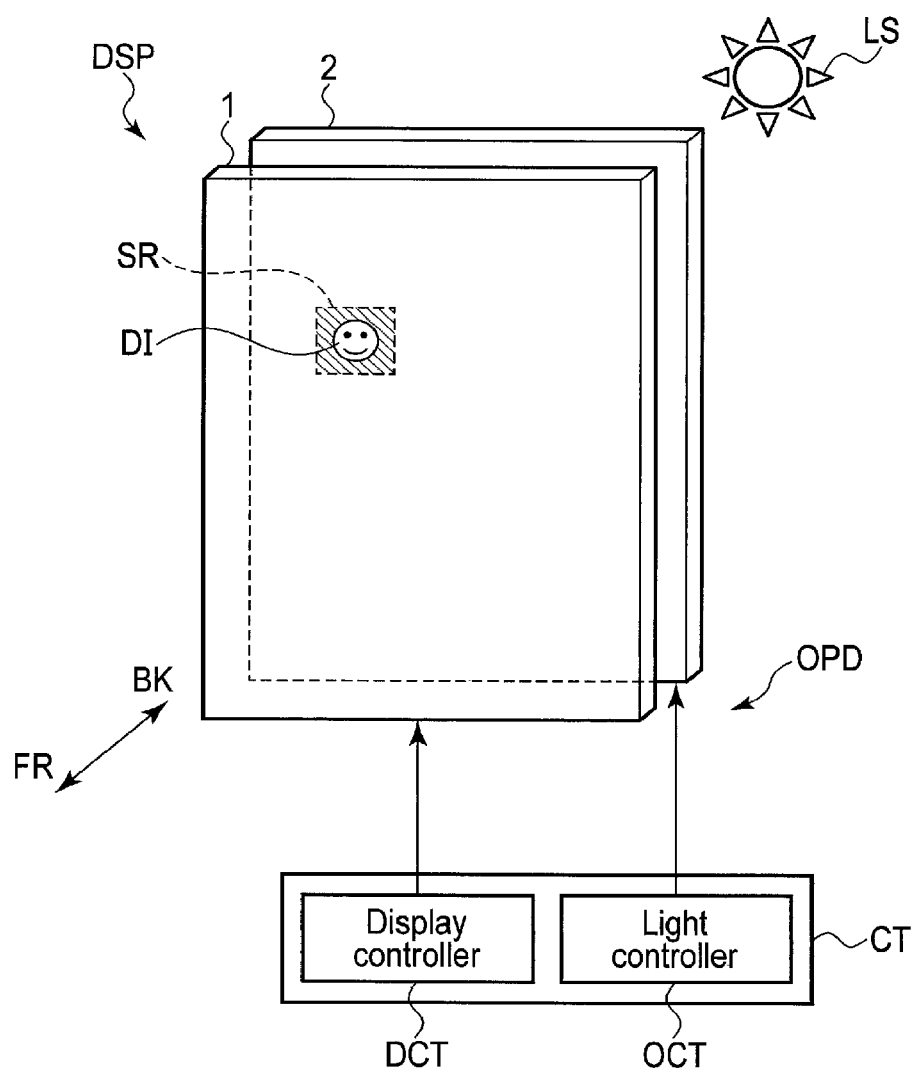
F I G. 23

OPTICAL ELEMENT

CROSS-REFERENCE TO RELATED APPLICATIONS

This application is based upon and claims the benefit of priority from Japanese Patent Application No. 2017-208399, filed Oct. 27, 2017, the entire contents of which are incorporated herein by reference.

FIELD

Embodiments described herein relate generally to an optical element.

BACKGROUND

A video display device comprising, for example, a diffusion-controlled liquid crystal panel and a liquid crystal display panel has been proposed. A diffusion-controlled liquid crystal panel can change a lens forming state of diffusing linearly polarized light which oscillates in a predetermined direction, of light having a directivity in a specific direction, and a non-lens forming state of maintaining the light directivity and urging the light to be transmitted. In the lens forming state, fine liquid crystal lenses are formed by applying a voltage to a liquid crystal layer.

Various types of technologies of forming lenses in a liquid crystal layer are well known.

BRIEF DESCRIPTION OF THE DRAWINGS

FIG. 1 is a diagram showing a configuration example of an optical device according to a first embodiment.

FIG. 6 is a cross-sectional view showing a configuration example of a modulating element.

FIG. 7 is a view for explanation of a modulating portion and an unmodulating portion formed in the modulating element.

FIG. 8 is a view for explanation of an action of the optical element.

FIG. 9 is a view for explanation of an action of the optical element.

FIG. 11 is a view for explanation of an action of the optical element shown in FIG. 10.

FIG. 12 is a view showing a configuration example of an optical element of an optical device according to a third embodiment.

FIG. 13 is a view for explanation of an action of the optical element shown in FIG. 12.

FIG. 14 is a view showing a configuration example of an optical element of an optical device according to a fourth embodiment.

FIG. 15 is a view for explanation of an action of the optical element shown in FIG. 14.

FIG. 16 is a perspective view showing a configuration example of an optical element of an optical device according to a fifth embodiment.

FIG. 17 is a perspective view showing a configuration example of a second liquid crystal element.

FIG. 18 is a view showing a cross section of the optical element seen in line XVIII-XVIII in FIG. 16.

FIG. 19 is a view showing a cross section of the optical element seen in line XIX-XIX in FIG. 16.

FIG. 20 is a view showing a configuration example of an optical element of an optical device according to a sixth embodiment.

FIG. 22 is a view showing a configuration example of an optical element of an optical device according to an eighth embodiment.

FIG. 23 is a view showing a configuration example of a display device according to a ninth embodiment.

DETAILED DESCRIPTION

Figure 2:
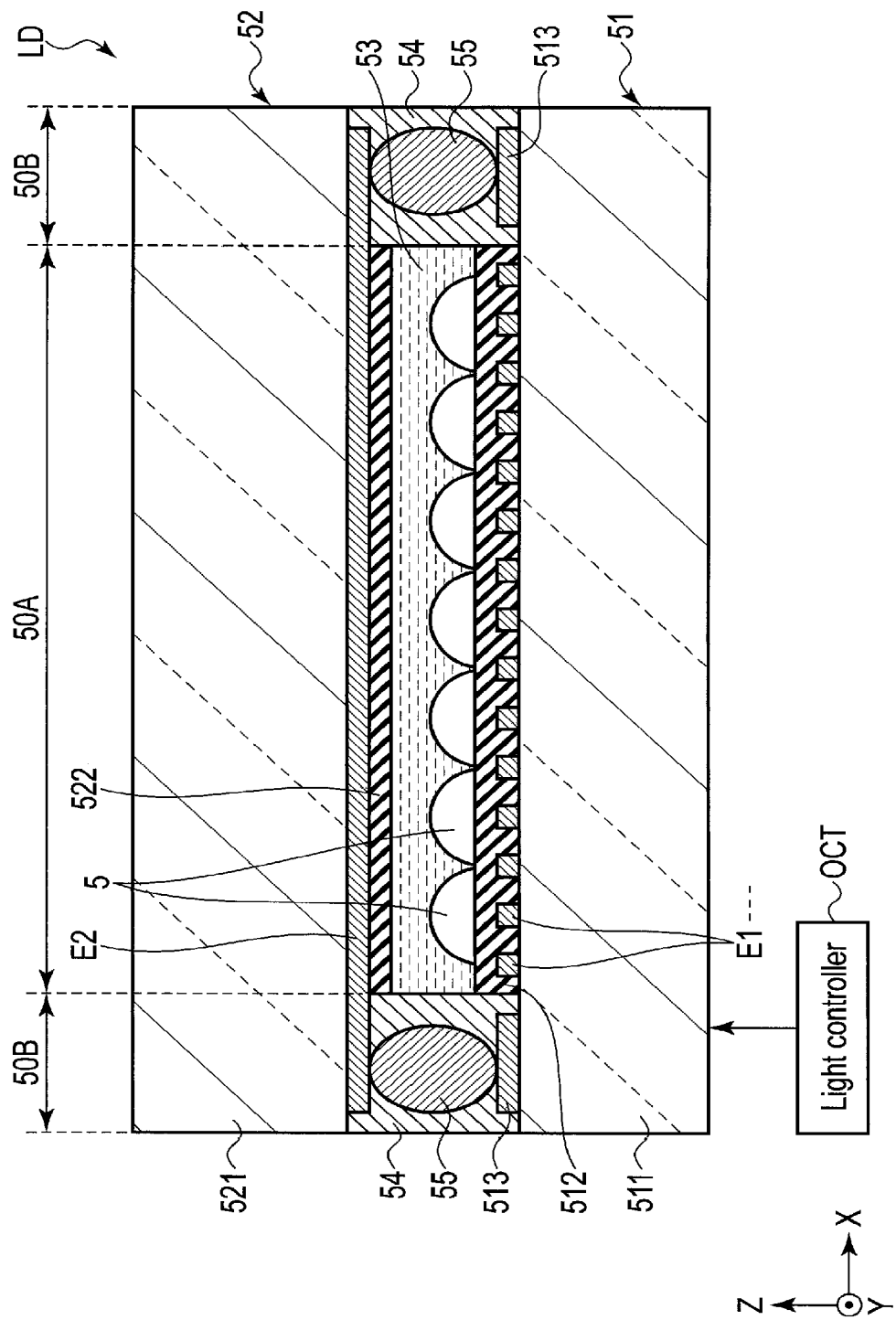
FIG. 2 is a cross-sectional view showing a configuration example of a liquid crystal element.

In general, according to one embodiment, an optical element, comprises: a first liquid crystal lens formed of liquid crystal molecules; a polarizer opposed to the first liquid crystal lens; a first modulating portion located between the first liquid crystal lens and the polarizer to modulate incident light; and a first unmodulating portion located between the first liquid crystal lens and the polarizer and adjacent to the first modulating portion.

According to another embodiment, an optical element, comprises: a first liquid crystal lens formed of liquid crystal molecules; a first reflective portion opposed to the first liquid crystal lens and reflecting incident light; and a first transmissive portion opposed to the first liquid crystal lens and adjacent to the first reflective portion, wherein the first reflective portion and the first transmissive portion are arranged in a first direction, and a width of the first reflective portion in the first direction is smaller than a width of the first transmissive portion in the first direction.

According to another embodiment, an optical element, comprises: a liquid crystal lens formed of liquid crystal molecules; a light-shielding portion opposed to the liquid crystal lens and blocking incident light; and a transmissive portion opposed to the liquid crystal lens and adjacent to the light-shielding portion, wherein the light-shielding portion and the transmissive portion are arranged in a first direction, and a width of the light-shielding portion in the first direction is smaller than a width of the transmissive portion in the first direction.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Embodiment

FIG. 1 is a diagram showing a configuration example of an optical device OPD according to a first embodiment. In the figure, the first direction X, the second direction Y, and the third direction Z are orthogonal to each other but may intersect at an angle other than ninety degrees. In the following explanations, a direction of a tip of an arrow indicating the third direction Z is referred to as an upper direction, and an opposite direction of the tip of the arrow is referred to as a lower direction. In addition, watching an X-Y plane defined by the first direction X and the second direction Y from the upper direction in the third direction Z is referred to as planar view.

An optical device OPD comprises an optical element 2 and a controller CT.

The optical element 2 comprises a liquid crystal element LD, a modulating element MD, and a polarizer PL. In the optical element 2, the polarizer PL, the modulating element MD, and the liquid crystal element LD are arranged in this order in the third direction Z. The liquid crystal element LD is opposed to the modulating element MD. The modulating element MD is located between the polarizer PL and the liquid crystal element LD in the third direction Z. The polarizer PL is opposed to the modulating element MD. In other words, the polarizer PL is opposed to the liquid crystal element LD via the modulating element MD.

The liquid crystal element LD comprises liquid crystal lenses (hereinafter simply called lenses) 5. The lenses 5 are, for example, arranged in the first direction X, in the liquid crystal element LD. In addition, the lenses 5 extend in, for example, the second direction Y. The lenses 5 may be fixed to predetermined positions or may be configured such that their positions are variable.

The modulating element MD may be composed of a liquid crystal element having a phase difference electrically controllable in part or may be composed of a phase difference film partially having a phase difference. A detailed configuration example of the modulating element MD will be explained below and, if the modulating element MD is composed of the liquid crystal element explained below, the modulating element MD is electrically controlled by a light controller OCT.

The modulating element MD comprises a modulating portion MA and an unmodulating portion NMA. The modulating portions MA are arranged in the first direction X and spaced apart in the modulating element MD. The unmodulating portion NMA is adjacent to the modulating portions MA in the first direction X. In the example illustrated, the modulating portions MA and the unmodulating portions NMA are arranged alternately in the first direction X. The modulating portions MA and the unmodulating portions NMA extend in, for example, the second direction Y. In addition, the modulating portions MA are disposed at positions where, for example, the light is converged by the lenses 5. The modulating portions MA and the unmodulating portions NMA are located between the lenses 5 and the polarizer PL, in the third direction Z. For example, the modulating portions MA, the unmodulating portions NMA, and the lenses 5 overlap in the third direction Z. The modulating portions MA and the unmodulating portions NMA may be fixed to predetermined positions or may be constituted such that their positions are variable. If the modulating element MD is composed of a liquid crystal element to be explained below, the modulating portions MA and the unmodulating portions NMA are formed by applying the voltage to the electrode. For example, a width W1 of the modulating portion MA in the first direction X is smaller than a width W2 of the unmodulating portion NMA in the first direction X and is smaller than width W3 of the lens 5 in the first direction X (or a gap between control electrodes E1 to form the lens 5).

The modulating portion MA comprises a function of imparting a phase difference to the incident light, for example, imparts a phase difference of approximately $\lambda/2$ to the incident light. $\lambda$ is a waveform of the incident light. The modulating portion MA comprises a function of rotating the polarization plane at approximately ninety degrees if the incident light is linearly polarized light.

The polarizer PL extends in the first direction X and is opposed to the modulating portions MA and the unmodulating portions NMA. The polarizer PL urges light polarized in a specific direction to be transmitted.

The controller CT comprises the light controller OCT. The light controller OCT is electrically connected to the optical element 2 to control the optical element 2.

The optical device OPD can urge the light incident from any one of the upper and lower directions to be transmitted and urge the light incident from the other direction to be non-transmitted.

FIG. 2 is a cross-sectional view showing a configuration example of the liquid crystal element LD.

The liquid crystal element LD comprises a substrate 51, a substrate 52, a liquid crystal layer 53, control electrodes E1, and a control electrode E2. In the example illustrated, the control electrodes E1 are provided on the substrate 51 while the control electrode E2 is provided on the substrate 52. The control electrodes E1 and the control electrode E2 may be provided on the same substrate, for example, the substrate 51 or the substrate 52.

The substrate 51 comprises a transparent insulating substrate 511, the control electrodes E1, an alignment film 512, and power supply lines 513. The control electrodes E1 are located between the insulating substrate 511 and the liquid crystal layer 53. The control electrodes E1 are arranged in the first direction X and spaced apart in an effective area 50A. For example, a width of the control electrode E1 in the first direction X is smaller than or equal to an interval between two control electrodes E1 adjacent to each other in the first direction X. The alignment film 512 covers the control electrodes E1 and are in contact with the liquid crystal layer 53. The power supply line 513 is located in an ineffective area 50B outside the effective area 50A.

The substrate 52 comprises a transparent insulating substrate 521, the control electrodes E2, and an alignment film 522. The control electrode E2 is located between the insulating substrate 521 and the liquid crystal layer 53. The control electrode E2 is, for example, a single plate electrode which is located on a substantially whole surface of the effective area 50A to extend to the ineffective area 50B. The control electrode E2 is opposed to the control electrodes E1 via the liquid crystal layer 53, in the effective area 50A. The control electrode E2 is opposed to the power supply lines 513 in the ineffective area 50B. The alignment film 522 covers the control electrode E2 and are in contact with the liquid crystal layer 53.

The insulating substrates 511 and 521 are, for example, glass substrates or resin substrates. The common electrodes E1 and E2 are formed of a transparent, electrically conductive material such as indium tin oxide (ITO) or indium zinc oxide (IZO). The alignment films 512 and 522 are, for example, horizontal alignment films, which are subjected to alignment in the first direction X.

The substrates 51 and 52 are bonded by a sealant 54 in the ineffective area 50B. The sealant 54 comprises a conductive material 55. The conductive material 55 is interposed between the power supply line 513 and the control electrode E2 to electrically connect the power supply line 513 and the control electrode E2 to each other.

The liquid crystal layer 53 is held between the substrates 51 and 52. The liquid crystal layer 53 is formed of, for example, a liquid crystal material having positive dielectric anisotropy. The control electrodes E1 and E2 apply a voltage to form lenses 5 to the liquid crystal layer 53.

The light controller OCT controls the voltage applied to the liquid crystal layer 53. The light controller OCT can change a first mode of forming the lenses 5 on the liquid crystal layer 53 and a second mode of not forming the lenses on the liquid crystal layer 53 by controlling the voltages supplied to the control electrodes E1 and E2, respectively. In addition, the light controller OCT can control the positions of formation of the lenses 5 by controlling the voltages supplied to the respective control electrodes E1, and can change a mode of forming the lenses 5 at first positions of the liquid crystal layer 53 and a mode of forming the lenses 5 at second positions different from the first positions of the liquid crystal layer 53. In addition, the light controller OCT can change a mode of forming the lenses 5 in a first shape on the liquid crystal layer 53 and a mode of forming the lenses 5 in a second shape different from the first shape on the liquid crystal layer 53, by controlling the voltages supplied to the respective control electrodes E1. In addition, the light controller OCT can change a mode of forming the lenses 5 in a first size on the liquid crystal layer 53 and a mode of forming the lenses 5 in a second size different from the first size on the liquid crystal layer 53, by controlling the voltages supplied to the respective control electrodes E1. In FIG. 2, plural lenses 5 are formed in the liquid crystal layer 53 but only one lens 5 may be formed in the liquid crystal layer 53.

Figure 3:
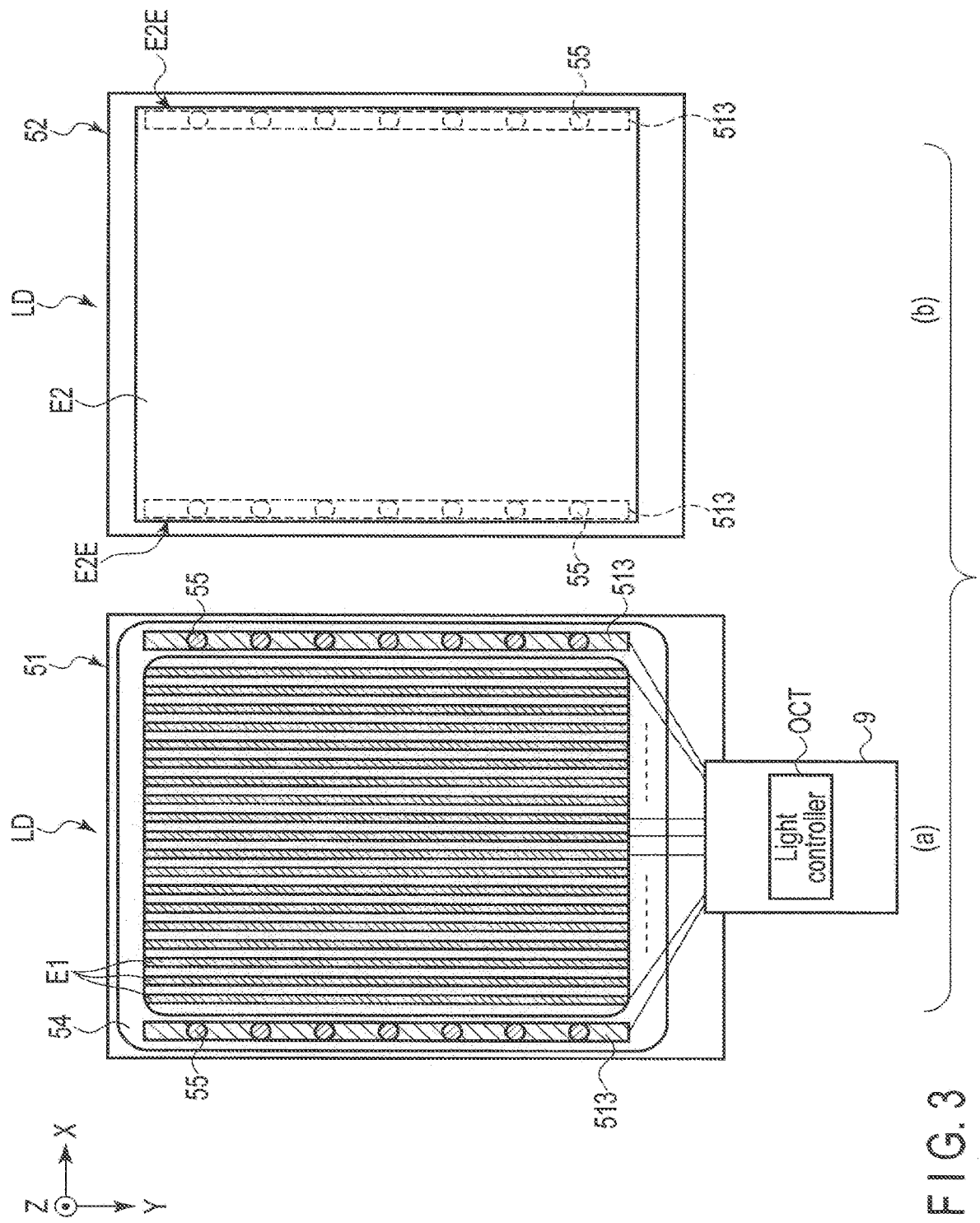
FIG. 3 is a plan view showing a configuration example of a liquid crystal element.

FIG. 3 is a plan view showing a configuration example of the liquid crystal element LD. FIG. 3(*a*) shows a plan view of the substrate 51 and FIG. 3(*b*) shows a plan view of the substrate 52.

The sealant 54 is formed in a frame shape on the substrate 51 shown in FIG. 3(*a*). The control electrodes E1 are located on an inner side surrounded by the sealant 54, and arranged in the first direction X and spaced apart from each other. Each of the control electrodes E1 is, for example, a strip electrode elongated in the second direction Y. The control electrodes E1 may be the strip electrodes elongated in the first direction X or island electrodes arranged in the first direction X and the second direction Y. The shape of the island electrodes is a polygon such as a rectangle or a hexagon, a circle, or the like. The power supply lines 513 extend in the second direction Y at positions which overlap the sealant 54. At least several parts of the conductive materials 55 included in the sealant 54 overlap the power supply lines 513. The wiring substrate 9 is connected to the substrate 51 to electrically connect each of the control electrodes E1 and the power supply lines 513 to the light controller OCT.

In the substrate 52 shown in FIG. 3(*b*), the control electrode E2 is formed in a rectangular shape and includes end portions E2E extending in the second direction Y. The end portions E2E overlap the power supply lines 513 and the conductive materials 55. In other words, the control electrode E2 is electrically connected to the light controller OCT via the conductive materials 55 and the power supply lines 513.

Figure 4:
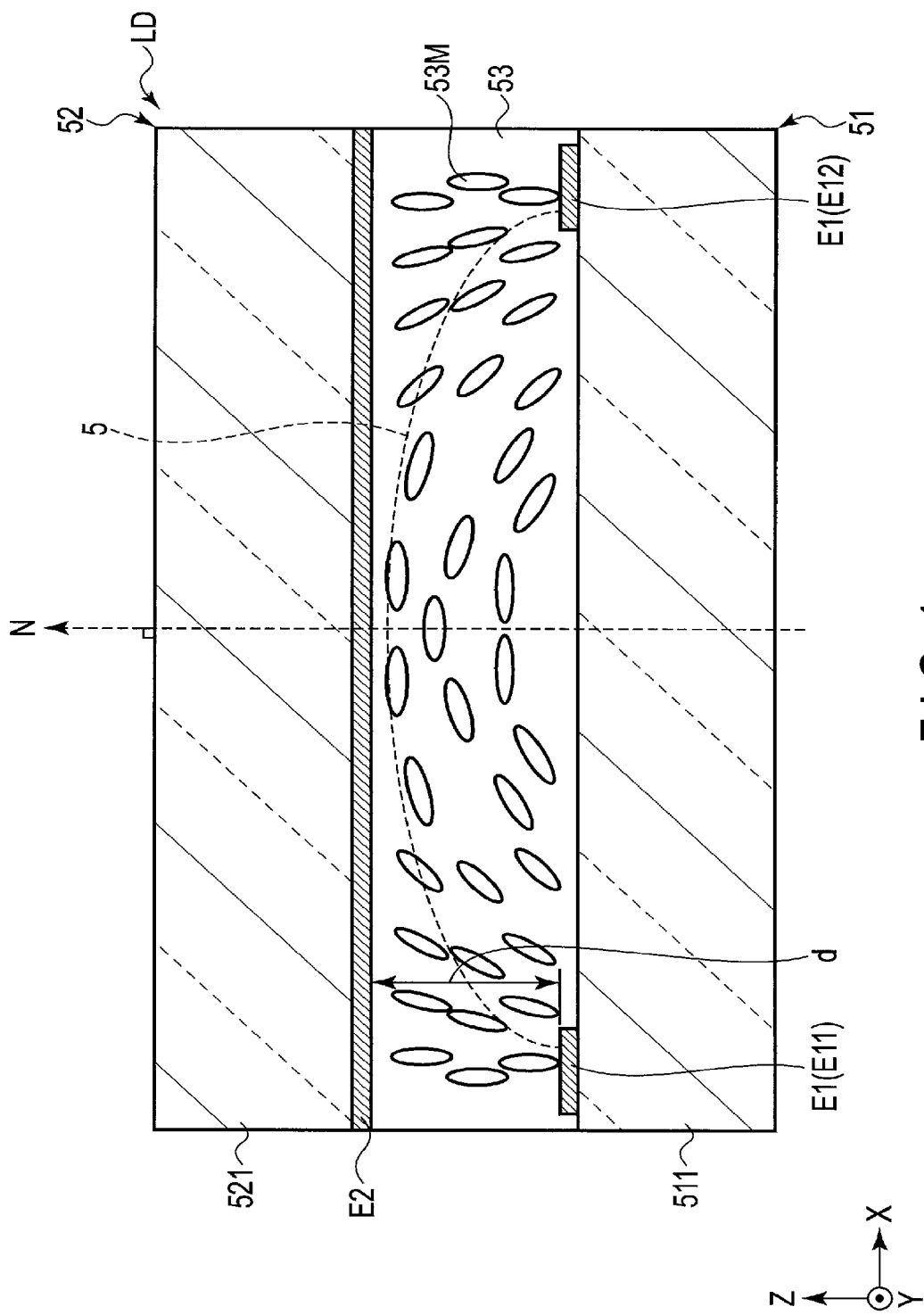
FIG. 4 is a view for explanation of a lens formed in a first liquid crystal layer.

FIG. 4 is a view for explanation of the lens 5 formed in the liquid crystal layer 53. Only constituent elements necessary for explanations are illustrated in FIG. 4. In the example shown in FIG. 4, the control electrodes E1 include control electrodes E11 and E12. FIG. 4 shows a state in which a voltage is applied between the control electrodes E11 and E12, and the control electrode E2. For example, a case where two control electrodes E11 and E12 have the same potential and the control electrode E2 has the different potential from the potential of the control electrodes E11 and E12 will be explained. In FIG. 4, the control electrodes E11 and E12 have the potential higher than the potential of the control electrode E2.

For example, the liquid crystal layer 53 has positive dielectric anisotropy as explained above. Liquid crystal molecules 53M contained in the liquid crystal layer 53 are initially aligned such that their major axes are arranged along the first direction X in a state in which the electric field is not formed, and aligned such that their major axes are aligned in the electric field in a state in which the electric field is formed.

For example, a voltage of 6V is supplied to the control electrodes E11 and E12, and a voltage of 0V is supplied to the control electrode E2. In an area where each of the control electrodes E11 and E12 is opposed to the control electrode E2, the liquid crystal molecules 53M are aligned such that their major axes are parallel to the third direction Z since an electric field parallel to the third direction Z is formed. In an area between the control electrodes E11 and E12, the liquid crystal molecules 53M are aligned such that their major axes are inclined to the third direction Z since an electric field inclined to the third direction Z is formed. In an intermediate area between the control electrodes E11 and E12, the liquid crystal molecules 53M are aligned such that their major axes are arranged in the first direction X since an electric field is hardly formed or is formed in the first direction X. The liquid crystal molecules 53M have refractive anisotropy Δn. For this reason, the liquid crystal layer 53 has refractive index distribution corresponding to the aligned state of the liquid crystal molecules 53M. Alternatively, the liquid crystal layer 53 has a retardation distribution or a phase distribution where the thickness of the liquid crystal layer 53 in the third direction Z is represented by d. The thickness d is, for example, in a range of 10 μm to 100 μm. The lens 5 represented by a dotted line in the drawing is formed by such a refractive index distribution, retardation distribution, or a phase distribution. The illustrated lens 5 functions as a convex lens. In addition, the illustrated lens 5 has a shape symmetrical about normal N of the liquid crystal element LD. The lens 5 is formed along the direction of extension of the control electrodes E1 and E2. For example, if the control electrodes E11 and E12, and the control electrode E2 extend in the second direction Y, the lens 5 extends in the second direction Y.

In the present embodiment, a combination of the liquid crystal layer 53 which is subjected to initial alignment substantially horizontal along a main substrate surface and the electric field which is arranged in a direction intersecting the main substrate surface has been explained as an example of the liquid crystal element LD comprising the lens 5, but the liquid crystal element LD is not limited to this. For example, a liquid crystal layer which is initially aligned substantially vertical to the main substrate surface may be combined or the liquid crystal layer may be combined with an electric field extending along the main substrate surface and, if the refractive index distribution is variable in accordance with the electric field applied to the liquid crystal layer, a liquid crystal element comprising the lens 5 can be implemented. The main substrate surface is an X-Y plane defined by the first direction X and the second direction Y. In addition, the lens 5 may not be formed of liquid crystal molecules and may be formed of a transparent member such as glass. In this case, the optical device OPD may not comprise the light controller OCT.

Figure 5:
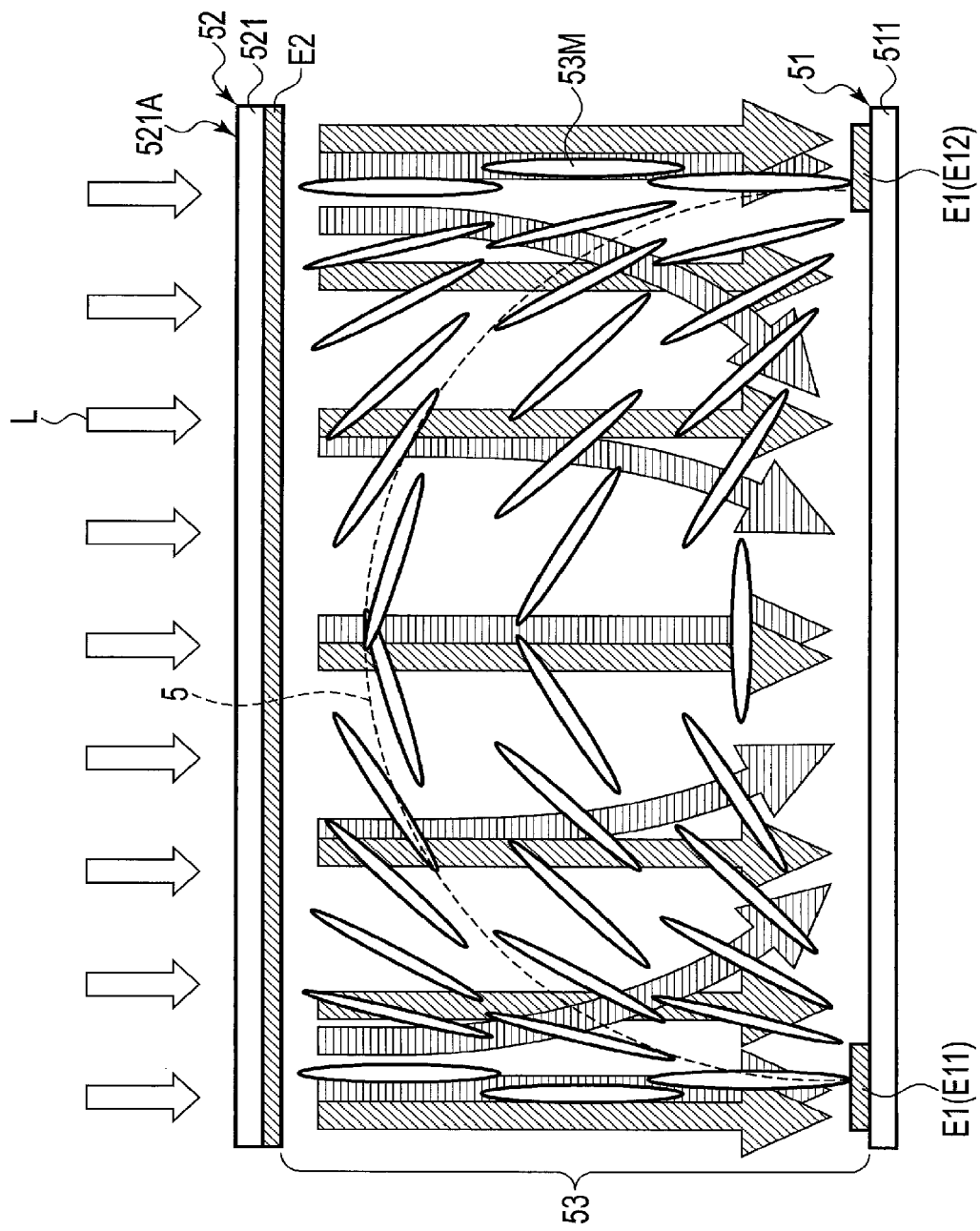
FIG. 5 is a view for explanation of an action of the lens shown in FIG. 4.
Figure 5:
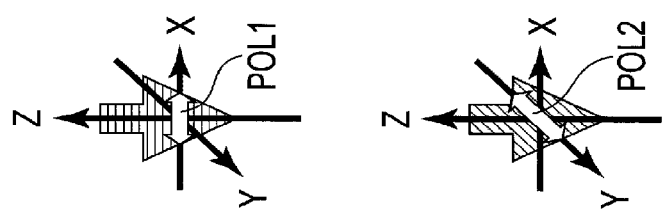

FIG. 5 is a view for explanation of an action of the lens 5 shown in FIG. 4.

When the direction of travel of the light is parallel to the third direction Z, linearly polarized light having a plane of oscillation parallel to the first direction X is called first polarized light POL1, and linearly polarized light having a plane of oscillation parallel to the second direction Y is called second polarized light POL2. The direction of travel of the light is the direction opposite to an arrow representing the third direction Z. The first polarized light POL1 is represented by an arrow having a lateral stripe pattern in the drawing, and the second polarized light POL2 is represented by an arrow having an oblique stripe pattern in the drawing. Light L is, for example, natural light having a random plane of oscillation. For example, the light L includes the first polarized light POL1 and the second polarized light POL2. It is assumed that, for example, the light L is made incident from an outer surface 521A of the insulating substrate 521 and travels from the substrate 52 toward the substrate 51.

The lens 5 has different effects for the first polarized light POL1 and the second polarized light POL2, respectively. That is, the lens 5 hardly refracts the second polarized light POL2 of the natural light L but urges the second polarized light POL2 to be transmitted, and refracts the first polarized light POL1. In other words, the lens 5 mainly exerts the converging action on the first polarized light POL1.

FIG. 6 is a cross-sectional view showing a configuration example of the modulating element MD. For example, the modulating element MD is assumed to be composed of the liquid crystal element in the following explanations. This modulating element MD is electrically controlled by the light controller OCT. In addition, the modulating element MD may be composed of a phase difference film partially having a phase difference as explained above.

The modulating element MD comprises a substrate (first substrate) 61, a substrate (second substrate) 62, a liquid crystal layer 63, control electrodes (first control electrodes) E3, and a control electrode (second control electrode) E4. In the example illustrated, the control electrodes E3 are provided on the substrate 61 and the control electrode E4 is provided on the substrate 62, but the control electrodes E3 and E4 may be provided on the same substrate, i.e., the substrate 61 or the substrate 62.

The substrate 61 comprises a transparent insulating substrate 611, the control electrodes E3, an alignment film 612, and power supply lines 613. The control electrodes E3 are located between the insulating substrate 611 and the liquid crystal layer 63. The control electrodes E3 are arranged in the first direction X and spaced apart in an effective area 60A. For example, a width of the control electrode E3 in the first direction X is larger than an interval between the control electrodes E3 adjacent to each other in the first direction X. The alignment film 612 covers the control electrodes E3 and are in contact with the liquid crystal layer 63. The power supply line 613 is located in an ineffective area 60B outside the effective area 60A.

The substrate 62 comprises a transparent insulating substrate 621, the control electrodes E4, and an alignment film 622. The control electrode E4 are located between the insulating substrate 621 and the liquid crystal layer 63. The control electrode E4 is, for example, a single plate electrode which is located on a substantially whole surface of the effective area 60A to extend to the ineffective area 60B. The control electrode E4 is opposed to the control electrodes E3 via the liquid crystal layer 63, in the effective area 60A. The control electrode E4 is opposed to the power supply lines 613 in the ineffective area 60B. The alignment film 622 covers the control electrode E4 and are in contact with the liquid crystal layer 63.

The insulating substrates 611 and 621 are, for example, glass substrates or resin substrates. The control electrodes E3 and E4 are formed of a transparent conductive material such as ITO or IZO. The control electrode E3 is a strip electrode elongated in the second direction Y, similarly to the control electrode E1 shown in FIG. 3. The control electrode E4 is a plate electrode having a rectangular shape, similarly to the control electrode E2 shown in FIG. 4. The alignment films 612 and 622 are, for example, horizontal alignment films. For example, the alignment film 612 is subjected to alignment in the second direction Y, and the alignment film 622 is subjected to alignment in the first direction X.

The substrates 61 and 62 are bonded by a sealant 64 in the ineffective area 60B. The sealant 64 comprises a conductive material 65. The conductive material 65 is interposed between the power supply line 613 and the control electrode E4 to electrically connect the power supply line 613 and the control electrode E4 to each other.

The liquid crystal layer 63 is held between the substrates 61 and 62. The liquid crystal layer 63 is formed of, for example, a liquid crystal material having positive dielectric anisotropy. The control electrodes E3 and E4 apply the voltage to form the modulating portion MA and the unmodulating portion NMA shown in FIG. 6 to the liquid crystal layer 63.

The light controller OCT controls the voltage applied to the liquid crystal layer 63. The light controller OCT can form the modulating portion MA and the unmodulating portion NMA in the liquid crystal layer 63 by controlling the voltages which are supplied to the control electrodes E3 and E4. The modulating portion MA alone may be formed or the unmodulating portion NMA alone may be formed in the liquid crystal layer 63. In addition, the light controller OCT can control the positions of formation of the modulating portion MA and the unmodulating portion NMA by controlling the voltages which are supplied to the control electrodes E3. In addition, the light controller OCT can freely control the size of the modulating portion MA and the unmodulating portion NMA by controlling the voltages which are supplied to the control electrodes E3.

FIG. 7 is a view for explanation of the modulating portions MA and the unmodulating portions NMA formed in the modulating element MD. Only constituent elements necessary for explanations are illustrated in FIG. 7. In the example illustrated, the control electrodes E3 include control electrodes E31, E32, E33, E34, and E35. The control electrodes E31, E33, and E35, of the control electrodes E31 to E35 arranged in the first direction X, are assumed to have the potential different from that of the control electrode E4.

The liquid crystal layer 63 has positive dielectric anisotropy as explained above. Liquid crystal molecules 63M contained in the liquid crystal layer 63 are subjected to twisted alignment at ninety degrees in a state in which the electric field is not formed. In other words, the liquid crystal molecules 63M in close vicinity to the control electrodes E31 to E35 are subjected to initial alignment such that their major axes are parallel to the second direction Y, and the liquid crystal molecules 63M in close vicinity to the control electrode E4 are subjected to initial alignment such that their major axes are parallel to the first direction X. In addition, the liquid crystal molecules 63M are aligned such that their major axes are parallel to the electric field in the state in which the electric field is formed.

For example, the voltage of the control electrodes E31, E33, and E35 is assumed to be 6V and the voltage of the control electrodes E32, E34, and E4 is assumed to be 0V in the following explanations. In an area where each of the control electrodes E31, E33, and E35 is opposed to the control electrode E4, the liquid crystal molecules 63M are aligned such that their major axes are parallel to the third direction Z since an electric field parallel to the third direction Z is formed. In an area where each of the control electrodes E32 and E34 is opposed to the control electrode E4, the liquid crystal molecules 63M are maintained in the initial alignment state and subjected to twist alignment since no electric field is formed.

It is assumed that the first polarized light POL1 is made incident on the modulating element MD. The first polarized light POL1 incident on the area where the control electrode E32 is opposed to the control electrode E4, of the first polarized light POL1 incident from the substrate 62, receives an influence from the twist-aligned liquid crystal molecules 63M, its polarization plane is rotated, the polarized light is transmitted through the liquid crystal layer 63 and then converted into second polarized light POL2 having a plane of oscillation in the second direction Y. In the area where the control electrode E34 is opposed to the control electrode E4, too, the transmitted light is converted into the second polarized light POL2. In contrast, the first polarized light POL1 incident on the area where the control electrode E34 is opposed to the control electrode E4 hardly receives an influence from the vertically aligned liquid crystal molecules 63M, its polarization plane is maintained, and the polarized light is transmitted through the liquid crystal layer 63. In the area where the control electrodes E31 and E35 are opposed to the control electrode E4, too, the transmitted light is the first polarized light POL1.

In other words, the area where each of the control electrodes E31, E33, and E35 is opposed to the control electrode E4 corresponds to the unmodulating portion NMA shown in FIG. 1, and the area where each of the control electrodes E32 and E34 is opposed to the control electrode E4 corresponds to the modulating portion MA shown in FIG. 1.

In the present embodiment, a combination of the liquid crystal layer 63 which is subjected to twist alignment in the initial alignment state and the electric field which is arranged in a direction intersecting the main substrate surface has been explained as an example of the modulating element MD, but the present embodiment is not limited to this. If the area where the incident light is modulated in response to the voltage applied to the liquid crystal layer 63 and the area where the incident light is transmitted without being modulated can be formed, this formation can be applied to the modulating element MD.

If the modulating portion MA and the unmodulating portion NMA are formed in a strip shape elongated in the second direction Y, each of the control electrodes E31 to E35 may be formed in a strip electrode elongated in the second direction Y. However, the control electrode E3 may be a strip electrode elongated in the first direction X and, in this case, the modulating portion MA and the unmodulating portion NMA may be formed in a strip shape elongated in the first direction X. In addition, the control electrodes E3 may be arrayed in a matrix and, in this case, the modulating portion MA and the unmodulating portion NMA can be formed in an optional shape such as a dot shape or a strip shape.

FIG. 8 is a view for explanation of an action of the optical element 2. In FIG. 8, the light L is made incident on the optical element 2 from an upper side in the third direction Z.

In the example illustrated, the polarizer PL has a transmission axis T1 which urges the first polarized light POL1 to be transmitted. In the following explanations, the polarizer PL is assumed to have the transmission axis T1 which urges the first polarized light POL1 to be transmitted. The polarizer PL may not have the transmission axis T1 which urges the first polarized light POL1 to be transmitted, but a transmission axis which urges the second polarized light POL2 to be transmitted.

First, the light L is made incident on the liquid crystal element LD. The first polarized light POL1, of the light L incident on the liquid crystal element LD, is converged to the modulating element MD by the lens 5 as shown on the left side of FIG. 8. The first polarized light POL1 converged by the lens 5 is made incident on the modulating portion MA and modulated to the second polarized light POL2 at the modulating portion MA. In the example illustrated, the second polarized light POL2 converted at the modulating portion MA is made incident on the polarizer PL and blocked by the polarizer PL. In other words, the first polarized light POL1, of the light L incident on the optical element 2 from the upper side, is blocked by the optical element 2.

In contrast, the second polarized light POL2 of the light L incident on the liquid crystal element LD is hardly converged by the lens 5, but is made incident on the modulating element MD as shown on the right side of FIG. 8. The second polarized light POL2 passing through the liquid crystal element LD is made incident on the modulating portion MA and the unmodulating portion NMA. As explained above, the width W2 of the unmodulating portion NMA is larger than the width W1 of the modulating portion MA. For this reason, most of the second polarized light POL2 incident on the modulating element MD is made incident on the unmodulating portion NMA. That is, most of the second polarized light POL2 incident on the modulating element MD is not modulated but is transmitted through the modulating element MD. In the example illustrated, the second polarized light POL2 transmitted through the modulating element MD is made incident on the polarizer PL and blocked by the polarizer PL. Part of the second polarized light POL2 incident on the modulating element MD is made incident on the modulating portion MA and modulated to the first polarized light POL1 at the modulating portion MA. The first polarized light POL1 converted at the modulating portion MA is made incident on the polarizer PL and is transmitted through the polarizer PL. In other words, most of the second polarized light POL2, of the light L incident on the optical element 2 from the upper side, is blocked by the optical element 2. Therefore, most of the light L incident from the upper side of the optical element 2 is blocked by the optical element 2.

FIG. 9 is a view for explanation of an action of the optical element 2. In FIG. 9, the light L is made incident on the liquid crystal element LD from the lower side in the third direction Z.

First, the light L is made incident on the polarizer PL. The first polarized light POL1, of the light L incident on the polarizer PL, is made incident on the polarizer PL and transmitted through the polarizer PL, as shown on a left side of the FIG. 9. In the example illustrated, as explained above, since the width W2 of the unmodulating portion NMA is larger than the width W1 of the modulating portion MA, most of the first polarized light POL1 transmitted through the polarizer PL is made incident on the unmodulating portion NMA and transmitted through the modulating element MD. In other words, most of the first polarized light POL1 transmitted through the polarizer PL is not modulated but is transmitted through the modulating element MD. The first polarized light POL1 transmitted through the modulating element MD is made incident on the liquid crystal element LD and converged by the lens 5. Part of the first polarized light POL1 incident on the modulating element MD is made incident on the modulating portion MA and converted into the second polarized light POL2 at the modulating portion MA. The second polarized light POL2 converted in the modulating portion MA is made incident on the liquid crystal element LD and transmitted through the liquid crystal element LD. In other words, the first polarized light POL1, of the light L incident on the optical element 2 from the lower side, is transmitted through the optical element 2.

In contrast, the second polarized light POL2, of the light L incident on the polarizer PL, is blocked by the polarizer PL as shown on a right side of the FIG. 9. In other words, the second polarized light POL2, of the light L incident on the optical element 2 from the lower side, is blocked by the optical element 2. Therefore, almost half of the light, of the light L incident on the optical element 2 from the lower side, is transmitted through the optical element 2.

Thus, the optical element 2 blocks most of the light L incident from the upper side and urges most of the light L incident from the lower side to be transmitted. In other words, the optical element 2 seems bright from the upper side while the optical element 2 seems darker from the lower side than from the upper side. For this reason, the optical element 2 can control the transmitted light.

According to the first embodiment, the optical device OPD controls the light transmitted through the optical element 2 by controlling the optical element 2 by the controller CT. For this reason, the optical device OPD capable of controlling the transmitted light can be provided.

Next, other embodiments of the optical element 2 will be explained. In the other configuration examples of the optical element 2 described below, portions similar to those of the first embodiment are denoted by the same reference numerals and detailed explanation is omitted, and portions different from those of the above-explained embodiment will be particularly explained in detail. The same advantages as those of the above-explained embodiment can be obtained in the optical device OPD employing the other configuration examples of the optical element 2, too.

Second Embodiment

Figure 10:
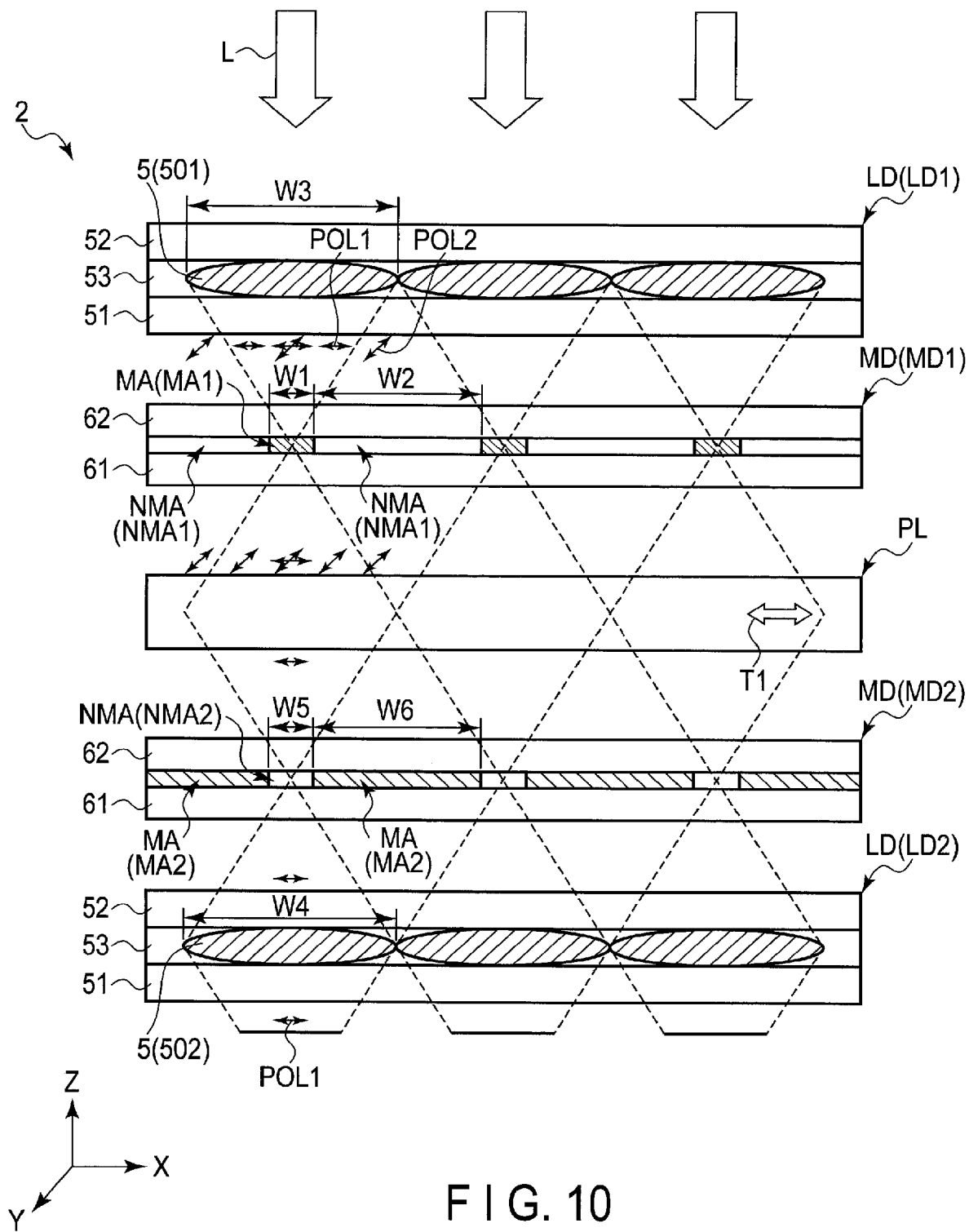
FIG. 10 is a view showing a configuration example of an optical element of an optical device according to a second embodiment.

FIG. 10 is a view showing a configuration example of an optical element 2 of an optical device OPD according to a second embodiment. The optical element 2 shown in FIG. 10 is different from the optical element 2 according to the first embodiment with respect to a feature of comprising liquid crystal elements LD and modulating elements MD. In FIG. 10, light L is made incident on the optical element 2 from an upper side in the third direction Z.

In the example illustrated, the optical element 2 comprises a first liquid crystal element LD1, a first modulating element MD1, a polarizer PL, a second modulating element MD2, and a second liquid crystal element LD2. In the optical element 2, the second liquid crystal element LD2, the second modulating element MD2, the polarizer PL, the first modulating element MD1, and the first liquid crystal element LD1 are arranged in this order in the third direction Z. The first liquid crystal element LD1 is opposed to the first modulating element MD1. The first modulating element MD1 is located between the first liquid crystal element LD1 and the polarizer PL. The polarizer PL is located between the first modulating element MD1 and the second modulating element MD2. The second modulating element MD2 is located between the polarizer PL and the second liquid crystal element LD2. The second liquid crystal element LD2 is opposed to the second modulating element MD2. That is, the polarizer PL is opposed to the first liquid crystal element LD1 via the first modulating element MD1, and opposed to the second liquid crystal element LD2 via the second modulating element MD2.

The first liquid crystal element LD1 and the second liquid crystal element LD2 comprise first lenses 501 and second lenses 502, respectively. The first liquid crystal element LD1 and the second liquid crystal element LD2 can employ the same configuration as the above-explained liquid crystal element LD. For example, each of the first lenses 501 and the second lenses 502 can be formed similarly to the above-explained lens 5. For example, the first lenses 501 are arranged in the first direction X, in the first liquid crystal element LD1. The first lenses 501 extend in, for example, the second direction Y. For example, the second lenses 502 are arranged in the first direction X, in the second liquid crystal element LD2. The second lenses 502 extend in, for example, the second direction Y. A width W4 of the second lens 502 is substantially equal to a width W3 of the first lens 501.

The first modulating element MD1 comprises a first modulating portion MA1 and a first unmodulating portion NMA1. The first modulating element MD1 can employ the same configuration as the above-explained modulating element MD. For example, the first modulating element MD1 is constituted by replacing the modulating portion MA of the above-explained modulating element MD with the first modulating portion MA1 and replacing the unmodulating portion NMA of the above-explained modulating element MD with the first unmodulating portion NMA1. For example, the first lens 501 and the first modulating portion MA1 overlap in the third direction Z.

The second modulating element MD2 comprises a second modulating portion MA2 and a second unmodulating portion NMA2. The second modulating element MD2 can employ substantially the same configuration as the above-explained modulating element MD, but is different from the above-explained modulating element MD with respect to the configurations of the second modulating portion MA2 and the second unmodulating portion NMA2. The second modulating portions MA2 are arranged in the first direction X in the second modulating element MD2. The second unmodulating portion NMA2 is adjacent to the second modulating portion MA2 in the first direction X. In the example illustrated, the second modulating portions MA2 and the second unmodulating portions NMA2 are arranged alternately in the first direction X. In addition, the second unmodulating portion NMA2 is disposed at a position where, for example, the light is converged by the second lenses 502. The second modulating portions MA2 and the second unmodulating portions NMA2 are located between the second lenses 502 and the polarizer PL, in the third direction Z. For example, the first unmodulating portions NMA1 and the second modulating portions MA2 overlap in the third direction Z. The first modulating portions MA1 and the second unmodulating portions NMA2 overlap in the third direction Z.

A width W5 of the second unmodulating portion NMA2 in the first direction X is smaller than a width W4 of the second lens 502 in the first direction X and is also smaller than a width W6 of the second modulating portion MA in the first direction X. In other words, the width W6 of the second modulating portion MA is larger than the width W5 of the second unmodulating portion. For example, the width W5 of the second unmodulating portion NMA2 is substantially equal to the width W1 of the first modulating portion MA. In addition, the width W6 of the second modulating portion MA2 is substantially equal to the width W2 of the first unmodulating portion NMA1. The width W5 of the second unmodulating portion NMA2 may be smaller than the width W1 of the first modulating portion MA1. In addition, the width W6 of the second modulating portion MA2 may be larger than the width W2 of the first unmodulating portion NMA1.

Next, an action of the optical element 2 in a case where the light L is made incident from the upper side in the third direction Z will be explained with reference to FIG. 10.

First, the light L is made incident on the first liquid crystal element LD1. As explained with reference to FIG. 8, first polarized light POL1 of the light L incident on the first liquid crystal element LD1 is converged to the first modulating portions MA1 by the first lenses 501, made incident on the first modulating portions MA1, and modulated to second polarized light POL2 by the first modulating portions MA1, and the second polarized light POL2 is made incident on the polarizer PL and blocked by the polarizer PL.

In contrast, most of the second polarized light POL2 of the light L incident on the first liquid crystal element LD1 is transmitted through the first liquid crystal element LD1, made incident on the first unmodulating portions NMA1, transmitted through the first unmodulating portion NMA1, made incident on the polarizer PL, and blocked by the polarizer PL. Part the second polarized light POL2 of the light L incident on the first liquid crystal element LD1 is made incident on the first modulating portions MA1 and modulated to the first polarized light POL1 by the first modulating portions MA1, and the first polarized light POL1 is made incident on polarizer PL and transmitted through the polarizer PL. In the example illustrated, the first polarized light POL1 transmitted through the polarizer PL is made incident on the second unmodulating portions NMA2, transmitted through the second unmodulating portions NMA2, made incident on the second liquid crystal element LD2, and converged by the second lenses 502.

FIG. 11 is a view for explanation of the action of the optical element 2 shown in FIG. 10. In FIG. 11, the light L is made incident on the optical element 2 from the lower side in the third direction Z. Next, an action of the optical element 2 in a case where the light L is made incident from the lower side in the third direction Z will be explained with reference to FIG. 11.

First, the light L is made incident on the second liquid crystal element LD2. As explained with reference to FIG. 9, the first polarized light POL1 of the light L incident on the second liquid crystal element LD2 is converged by the second lenses 502, made incident on the second unmodulating portions NMA2, transmitted through the second modulating element MD2, and made incident on the polarizer PL. In the example illustrated, the first polarized light POL1 incident on the polarizer PL is transmitted through the polarizer PL. Most of the first polarized light POL1 transmitted through the polarizer PL is made incident on the first unmodulating portions NMA1, transmitted through the first modulating element MD1, made incident on the first liquid crystal element LD1, and converged by the first lenses 501. Part of the first polarized light POL1 transmitted through the polarizer PL is made incident on the first modulating portions MA1 and modulated to the second polarized light POL2 by the first modulating portions MA1, and the second polarized light POL2 is made incident on the first liquid crystal element LD1 and transmitted through the first liquid crystal element LD1.

In contrast, most of the second polarized light POL2 of the light L incident on the second liquid crystal element LD2 is transmitted through the second liquid crystal element LD2, made incident on the second modulating portions MA2 and modulated to the first polarized light POL1 by the second modulating portions MA2, and the first polarized light POL1 is made incident on polarizer PL. In the example illustrated, the first polarized light POL1 incident on the polarizer PL is transmitted through the polarizer PL. Most of the first polarized light POL1 transmitted through the polarizer PL is made incident on the first unmodulating portions NMA1, transmitted through the first modulating element MD1, made incident on the first liquid crystal element LD1, and converged by the first lenses 501. Part of the first polarized light POL1 transmitted through the polarizer PL is made incident on the first modulating portions MA1 and modulated to the second polarized light POL2 by the first modulating portions MA1, and the second polarized light POL2 is made incident on the first liquid crystal element LD1 and transmitted through the first liquid crystal element LD1. Part of the second polarized light POL2 of the light L incident on the second liquid crystal element LD2 is made incident on the second unmodulating portions NMA2, transmitted through the second modulating element MD2, and made incident on the polarizer PL. In the example illustrated, the second polarized light POL2 incident on the polarizer PL is transmitted through the polarizer PL.

Thus, the optical element 2 shown in FIG. 10 and FIG. 11 blocks most of the light L incident from the upper side. In addition, the optical element 2 urges most of the first polarized light POL1 of the light L incident from the lower side to be transmitted, and modulates the second polarized light POL2 of the light L incident from the lower side to the first polarized light POL1 and urges the first polarized light POL1 to be transmitted. For this reason, the optical element 2 urges most of the light incident from the lower side to be transmitted.

In the configuration example of the second embodiment, too, the same advantages as those of the first embodiment can be obtained. In addition, the optical element 2 can urge most of the light incident from either of the upper side and the lower side to be transmitted and can block most of the light incident from the other side. The light controller OCT can electrically control the first modulating element MD1 and the second modulating element MD2. For example, if the positions of formation of the first modulating portions MA1 and the first unmodulating portions NMA1 are changed in the first modulating element MD1 and if the positions of formation of the second modulating portions MA2 and the second unmodulating portions NMA2 are changed in the second modulating element MD2, the optical element 2 urges most of the light L incident from the upper side in the third direction to be transmitted and blocks most of the light L incident from the lower side in the third direction Z.

Third Embodiment

FIG. 12 is a view showing a configuration example of an optical element 2 of an optical device OPD according to a third embodiment. The optical element 2 shown in FIG. 12 is different from the optical element 2 of the first embodiment with respect to a feature of comprising a reflective element RD. In FIG. 12, light L is made incident on the optical element 2 from an upper side in the third direction Z.

In the example illustrated, the optical element 2 comprises a liquid crystal element LD and a reflective element RD. In the optical element 2, the reflective element RD and the liquid crystal element LD are arranged in this order in the third direction Z. The liquid crystal element LD is opposed to the reflective element RD.

The reflective element RD comprises a reflective portion RF and a transparent portion TP. The reflective element RD can employ substantially the same configuration as the above-explained modulating element MD. For example, the reflective element RD is constituted by replacing the modulating portion MA of the above-explained modulating element MD with the reflective portion RF and replacing the unmodulating portion NMA with the transparent portion TP. The reflective portion RF reflects incident light. The transparent portion TP urges the incident light to be transmitted. For example, the transparent portion TP may be formed of a transparent member or space. The reflective portions RF are arranged in the first direction X and spaced apart, on the reflective element RD. The transparent portions TP are adjacent to the reflective portions RF in the first direction X. In the example illustrated, the reflective portions RF and the transparent portions TP are alternately arranged in the first direction X. The reflective portions RF and the transparent portions TP extend in, for example, the second direction Y. In addition, the reflective portions RF are disposed at positions where, for example, the light is converged by lenses 5. The reflective portions RF and the transparent portions TP are opposed to the lenses 5 in the third direction Z. For example, the lenses 5 overlap the reflective portions RF and the transparent portions TP in the third direction Z. The reflective portions RF and the transparent portion TP may be fixed to predetermined positions or may be constituted such that their positions are variable.

For example, a width W1 of the reflective portion RF in the first direction X is equal to the width W1 of the modulating portion MA shown in FIG. 1. In addition, a width W2 of the transparent portion TP in the first direction X is equal to the width W2 of the unmodulating portion NMA shown in FIG. 1. For this reason, the width W1 of the reflective portion RF is smaller than the width W3 of the lens 5 and is also smaller than the width W2 of the transparent portion TP.

In the example illustrated, the reflective element RD comprises a substrate 61. The reflective portions RE and the transparent portions TP are provided on the substrate 61. The reflective element RD may comprise a substrate 62, similarly to the above-explained modulating element MD. In this case, the reflective portions RF and the transparent portions TP may be provided between the substrates 61 and 62.

Next, an action of the optical element 2 in a case where the light L is made incident from the upper side in the third direction Z will be explained with reference to FIG. 12.

First, the light L is made incident on the liquid crystal element LD. First polarized light POL1 of the light L incident on the liquid crystal element LD is converged to the reflective portions RF by the lenses 5 and reflected by the reflective portions RF. The reflected first polarized light POL1 is made incident on the liquid crystal element LD again and converged by the lenses 5.

In contrast, most of second polarized light POL2 of the light L incident on the liquid crystal element LD is transmitted through the liquid crystal element LD, made incident on the transparent portions TP, and transmitted through the reflective element RD. Part of second polarized light POL2 of the light L incident on the liquid crystal element LD is transmitted through the liquid crystal element LD, made incident on the reflective portions RF, reflected by the reflective portions RF, made incident on the liquid crystal element LD again, and transmitted through the liquid crystal element LD.

FIG. 13 is a view for explanation of the action of the optical element 2 shown in FIG. 12. In FIG. 13, the light L is made incident on the optical element 2 from the lower side in the third direction Z. An action of the optical element 2 in a case where the light L is made incident from the lower side in the third direction Z will be explained with reference to FIG. 13.

First, the light L is made incident on the reflective element RD. Most of the first polarized light POL1 of the light L incident on the reflective element RD is made incident on the transparent portions TP, transmitted through the reflective element RD, made incident on the liquid crystal element LD, and converged by the lenses 5. Part of the first polarized light POL1 of the light L incident on the reflective element RD is made incident on the reflective portions RF and reflected by the reflective portions RF.

In contrast, most of the second polarized light POL2 of the light L incident on the reflective element RD is made incident on the transparent portions TP, transmitted through the reflective element RD, made incident on the liquid crystal element LD, and transmitted through the liquid crystal element LD. Part of the second polarized light POL2 of the light L incident on the reflective element RD is made incident on the reflective portions RF and reflected by the reflective portions RF.

Thus, the optical element 2 shown in FIG. 12 and FIG. 13 reflects substantially half part of the light L incident from the upper side and urges most of the light L incident from the lower side to be transmitted. For example, in the example shown in FIG. 12, the optical element 2 reflects most of the first polarized light POL1 of the light L incident from the upper side and urges most of the second polarized light POL2 to be transmitted. In the example shown in FIG. 13, the optical element 2 urges most of the first polarized light POL1 of the light L incident from the lower side to be transmitted and urges most of the second polarized light POL2 to be transmitted. For this reason, when the optical element 2 is seen from the upper side, the optical element 2 seems bright by the incident light which is made incident from the lower side and the reflected light of the incident light which is made incident from the upper side.

In the configuration example of the third embodiment, too, the same advantages as those of the first embodiment can be obtained. In addition, the optical element 2 seen from the upper side can be made bright by the incident light which is made incident from the lower side and the incident light which is made incident from the upper side.

Fourth Embodiment

FIG. 14 is a view showing a configuration example of an optical element 2 of an optical device OPD according to a fourth embodiment. The optical element 2 shown in FIG. 14 is different from the optical element 2 shown in FIG. 12 with respect to a feature of comprising liquid crystal elements LD and a retardation film PD. In FIG. 14, light L is made incident on the optical element 2 from an upper side in the third direction Z.

In the example illustrated, the optical element 2 comprises a first liquid crystal element LD1, a retardation film PD, a second liquid crystal element LD2, and a reflective element RD. In the optical element 2, the reflective element RD, the second liquid crystal element LD2, the retardation film PD, and the first liquid crystal element LD1 are arranged in this order in the third direction Z. The first liquid crystal element LD1 is opposed to the retardation film PD. The retardation film PD is located between the first liquid crystal element LD1 and the second liquid crystal element LD2. The second liquid crystal element LD2 is located between the retardation film PD and the reflective element RD. The reflective element RD is opposed to the second liquid crystal element LD2.

The first liquid crystal element LD1 and the second liquid crystal element LD2 comprise first lenses 501 and second lenses 502, respectively. The first liquid crystal element LD1 and the second liquid crystal element LD2 can employ the same configuration as the above-explained liquid crystal element LD. For example, each of the first lenses 501 and the second lenses 502 can be formed similarly to the above-explained lens 5. The second lenses 502 are located between the retardation film PD and the reflective element RD in the third direction Z. The first lenses 501 overlap the second lenses 502 in the third direction Z.

The reflective element RD comprises reflective portions RF and transparent portions TP. For example, the reflective portions RF and the transparent portions TP overlap the first lenses 501 and the second lenses 502 in the third direction Z.

The retardation film PD imparts a phase difference to the incident light. The retardation film PD imparts, for example, a phase difference of approximately λ/2 to the incident light. The retardation film PD comprises a function of rotating the polarization plane at approximately ninety degrees if the incident light is linearly polarized light. The retardation film PD is located between the first liquid crystal element LD1 and the second liquid crystal element LD2. The retardation film PD extends in the first direction X.

Next, an action of the optical element 2 in a case where the light L is made incident from the upper side in the third direction Z will be explained with reference to FIG. 14.

First, the light L is made incident on the first liquid crystal element LD1. First polarized light POL1 of the light L incident on the first liquid crystal element LD1 is converged to the reflective portions RF by first lenses 501. A distance between the first lens 501 and a focal point on the reflective portion RF is referred to as a focal distance (first focal distance) FL1 of the first lens 501 in the following explanations. The first polarized light POL1 converged by the lenses 501 is made incident on the retardation film PD and modulated into the second polarized light POL2 by the retardation film PD, and the second polarized light POL2 is made incident on the second liquid crystal element LD2. The second polarized light POL2 incident on the second liquid crystal element LD2 is transmitted through the second liquid crystal element LD2, made incident on the reflective portions RF, and reflected by the reflective portions RF. The second polarized light POL2 reflected by the reflective portions RF is made incident on the second liquid crystal element LD2 again, transmitted through the second liquid crystal element LD2, and made incident on the retardation film PD again. The second polarized light POL2 incident on the retardation film PD is modulated to the first polarized light POL1 by the retardation film PD, and the first polarized light POL1 is made incident on the first liquid crystal element LD1 again and converged on the first lenses 501.

In contrast, most of the second polarized light POL2 of the light L incident on the first liquid crystal element LD1 is transmitted through the first liquid crystal element LD1, made incident on the retardation film PD and modulated into the first polarized light POL1 by the retardation film PD, and the first polarized light POL1 is made incident on the second liquid crystal element LD2. The first polarized light POL1 incident on the second liquid crystal element LD2 is converged to the reflective portions RF by second lenses 502. A distance between the second lens 502 and a focal point on the reflective portion RF is referred to as a focal distance (second focal distance) FL2 of the second lens 502 in the following explanations. The focal distance FL1 is larger than the focal distance FL2. The first polarized light POL1 converged by the second lenses 502 is made incident on the reflective portions RF and reflected by the reflective portions RF. The first polarized light POL1 reflected on the reflective portions RF is made incident on the second liquid crystal element LD2 again, converged by the second lenses 502, made incident on the retardation film PD again, and modulated into the second polarized light POL2 by the retardation film PD, and the second polarized light POL2 is made incident on the first liquid crystal element LD1 again. The second polarized light POL2 incident on the first liquid crystal element LD1 is transmitted through the first liquid crystal element LD1.

FIG. 15 is a view for explanation of the action of the optical element 2 shown in FIG. 14. In FIG. 15, the light L is made incident on the optical element 2 from the lower side in the third direction Z. An action of the optical element 2 in a case where the light L is made incident from the lower side in the third direction Z will be explained with reference to FIG. 15.

First, the light L is made incident on the reflective element RD. Most of the first polarized light POL1 of the light L incident on the reflective element RD is made incident on the transparent portions TP, transmitted through the reflective element RD, and made incident on the second liquid crystal element LD2. The first polarized light POL1 incident on the second liquid crystal element LD2 is converged by the second lenses 502, made incident on the retardation film PD, and modulated into the second polarized light POL2 by the retardation film PD, and the second polarized light POL2 is made incident on the first liquid crystal element LD1. The second polarized light POL2 incident on the first liquid crystal element LD1 is transmitted through the first liquid crystal element LD1. Part of the first polarized light POL1 of the light L incident on the reflective element RD is made incident on the reflective portions RF and reflected by the reflective portions RF.

In contrast, most of the second polarized light POL2 of the light L incident on the reflective element RD is made incident on the transparent portions TP, transmitted through the reflective element RD, and made incident on the second liquid crystal element LD2. The second polarized light POL2 incident on the second liquid crystal element LD2 is transmitted through the second liquid crystal element LD2, made incident on the retardation film PD and modulated into the first polarized light POL1 by the retardation film PD, and the first polarized light POL1 is made incident on the first liquid crystal element LD1. The first polarized light POL1 incident on the first liquid crystal element LD1 is converged to the first liquid crystal element LD1. Part of the second polarized light POL2 of the light L incident on the reflective element RD is made incident on the reflective portions RF and reflected by the reflective portions RF.

Thus, the optical element 2 shown in FIG. 14 and FIG. 15 reflects the light L incident from the upper side and urges most of the light L incident from the lower side to be transmitted. That is, the optical element 2 emits the reflected light on the reflective portions RF in addition to the incident light from the lower side. For this reason, when the optical element 2 is seen from the upper side, the optical element 2 seems bright by the incident light which is made incident from the lower side and the reflected light of the incident light which is made incident from the upper side.

In the configuration example of the fourth embodiment, too, the same advantages as those of the first embodiment can be obtained. In addition, the optical element 2 seen from the upper side can be made bright by the incident light which is made incident from the lower side and the incident light which is made incident from the upper side.

Fifth Embodiment

FIG. 16 is a perspective view showing a configuration example of an optical element 2 of an optical device OPD according to a fifth embodiment. The optical element 2 shown in FIG. 16 is different from the optical element 2 shown in FIG. 12 with respect to a feature of comprising plural reflective elements.

In the example illustrated, the optical element 2 comprises a first liquid crystal element LD1, a first reflective element RD1, a second liquid crystal element LD3, and a second reflective element RD3. In the optical element 2, the second reflective element RD3, the second liquid crystal element LD3, the first reflective element RD1, and the first liquid crystal element LD1 are arranged in this order in the third direction Z. The first liquid crystal element LD1 is opposed to the first reflective element RD1. The first reflective element RD1 is located between the first liquid crystal element LD1 and the second liquid crystal element LD3. The second liquid crystal element LD3 is located between the first reflective element RD1 and the second reflective element RD3. The second reflective element RD3 is opposed to the second liquid crystal element LD3.

The first liquid crystal element LD1 comprises first lenses 501. The first liquid crystal element LD1 can employ the same configuration as the above-explained liquid crystal element LD. For example, the first lenses 501 are formed similarly to the above-explained lenses 5. For example, the first lenses 501 are formed similarly to the above-explained lenses 5. For example, the first lenses 501 are arranged in the first direction X, in the first liquid crystal element LD1. In addition, the first lenses 501 extend in, for example, the second direction Y.

The first reflective element RD1 comprises first reflective portions RF1 and first transparent portions TP1. The first reflective element RD1 can employ the same configuration as the above-explained reflective element RD. For example, the first reflective element RD1 is constituted by replacing the reflective portions RF of the reflective element RD with the first reflective portions RF1 and replacing the transparent portions TP with the first transparent portions TP1. For example, the first reflective portions RF1 can employ the same configuration as the reflective portions RF. In addition, the first transparent portions TP1 can employ the same configuration as the transparent portions TP. The first reflective portions RF1 and the first transparent portions TP1 extend in, for example, the second direction Y. For example, the first reflective element RD1 and the first transparent portions TP1 are opposed to the first lenses 501. In the example illustrated, the first lenses 501 overlap the first reflective portions RF1 and the first transparent portions TP1 in the third direction Z.

The second liquid crystal element LD3 comprises second lenses 503. The second liquid crystal element LD3 can employ substantially the same configuration as the above-explained liquid crystal element LD, but the second lens 503 is different in configuration from the above-explained liquid crystal element LD. For example, the second lenses 503 are arranged in the second direction Y, in the second liquid crystal element LD3. The second lenses 503 extend in the first direction X. The second lenses 503 intersect the first lenses 501 in planar view. For example, the second lenses 503 are opposed to the first reflective element RD1 on a side opposite to the first liquid crystal element LD1. The second lenses 503 may be fixed to predetermined positions or may be configured such that their positions are variable.

The second reflective element RD3 comprises second reflective portions RF3 and second transparent portions TP3. The second reflective element RD3 can employ substantially the same configuration as the above-explained reflective element RD, but is different from the above-explained reflective element RD with respect to the configurations of the second reflective portions RF3 and the second transparent portions TP3. The second reflective portions RF3 reflect incident light. The second transparent portions TP2 urge the incident light to be transmitted. For example, the second transparent portions TP3 may be formed of a transparent member or space. The second reflective portions RF3 are arranged in the second direction Y and spaced apart, on the second reflective element RD3. The second transparent portions TP3 are adjacent to the second reflective portions RF3 in the second direction Y. In the example illustrated, the second reflective portions RF3 and the second transparent portions TP3 are alternately arranged in the second direction Y. The second reflective portion RF3 and the second transparent portions TP3 extend in the first direction X. The second reflective portions RF3 are disposed at positions where, for example, the light is converged by second lenses 503. The second reflective portions RF3 and the second transparent portions TP3 are opposed to the second lenses 503 on a side opposite to the first reflective portions RF1 and the first transparent portions TP1 in the third direction Z. For example, the second lenses 503 overlap the second reflective portions RF3 and the second transparent portions TP in the third direction Z. The second reflective portions RF3 and the second transparent portions TP3 may be fixed to predetermined positions or may be constituted such that their positions are variable.

FIG. 17 is a perspective view showing a configuration example of the second liquid crystal element LD3.

The second liquid crystal element LD3 is configured such that, for example, the first liquid crystal element LD1 is rotated at ninety degrees around the third axis Z. The second liquid crystal element LD3 comprises a substrate 51, a substrate 52, a liquid crystal layer 53, control electrodes E6, and a control electrode E7. In the example shown in the drawing, the control electrodes E6 are provided on the substrate 51 while the control electrode E7 is provided on the substrate 52. The control electrodes E6 and the control electrode E7 may be provided on the same substrate, for example, the substrate 51 or the substrate 52. The control electrodes E6 are arranged in the second direction Y and spaced apart on the substrate 51. In the example illustrated, the control electrodes E6 extend in the first direction X. That is, the control electrodes E6 intersect the above-explained control electrodes E1 in planar view. The control electrode E7 can employ the same configuration as the above-explained control electrode E2. In the example illustrated, the control electrodes E6 have the potential higher than the potential of the control electrode E7. The second lenses 503 hardly refract the first polarized light POL1 of the natural light L but urges the first polarized light POL1 to be transmitted, and refracts the second polarized light POL2. That is, the second lenses 503 mainly exert the converging action on the second polarized light POL2.

FIG. 18 is a view showing a cross section of the optical element 2 seen in line XVIII-XVIII in FIG. 16. An action of the optical element 2 in a case where the light L is made incident from the upper side in the third direction Z will be explained with reference to FIG. 18.

First, the light L is made incident on the first liquid crystal element LD1. First polarized light POL1 of the light L incident on the first liquid crystal element LD1 is converged to the first reflective portions RF1 by the first lenses 501 and reflected on the first reflective portions RF1. The first polarized light POL1 reflected on the first reflective portions RF1 is made incident on the first liquid crystal element LD1 again and converged by the first lenses 501.

In contrast, second polarized light POL2 of the light L incident on the first liquid crystal element LD1 is transmitted through the first liquid crystal element LD1, made incident on the first transparent portions TP1, and transmitted through the first reflective elements RD1. The second polarized light POL2 transmitted through the first reflective element RD1 is made incident on the second liquid crystal element LD3, converged to the second reflective portions RF3 by the second lenses 503, and made incident on the second reflective portions RF3. The second polarized light POL2 incident on the second reflective portions RF3 is reflected on the second reflective portions RF3. The second polarized light POL2 reflected on the second reflective portions RF3 is made incident on the second liquid crystal element LD3 again, converged by the second lenses 503, made incident on the first transparent portions TP1, and transmitted through the first reflective element RD1. The second polarized light POL2 transmitted through the first transparent portions TP1 is made incident on the first liquid crystal element LD1 and transmitted through the first liquid crystal element LD1.

FIG. 19 is a view showing a cross section of the optical element 2 seen in line XIX-XIX in FIG. 16. An action of the optical element 2 in a case where the light L is made incident from the lower side in the third direction Z will be explained with reference to FIG. 19.

First, the light L is made incident on the second reflective element RD3. Most of the first polarized light POL1 of the light L incident on the second reflective element RD3 is made incident on the second transparent portions TP3, transmitted through the second reflective element RD3, made incident on the second liquid crystal element LD3, and transmitted through the second liquid crystal element LD3. Most of the first polarized light POL1 of the light L incident on the second reflective element RD3 is made incident on the first transparent portions TP1, transmitted through the first reflective element RD1, and made incident on the first liquid crystal element LD1. The first polarized light POL1 incident on the first liquid crystal element LD1 is converged by first lenses 501. Part of the first polarized light POL1 transmitted through the second liquid crystal element LD3 is made incident on the first reflective portions RF1, reflected on the first reflective portions RF1, made incident on the second liquid crystal element LD3 again, transmitted through the second liquid crystal element LD3, made incident on the second transparent portions TP3, and transmitted through the second reflective element RD3.

In addition, part of the first polarized light POL1 of the light L incident on the second reflective element RD3 is made incident on the second reflective portions RF3 shown in FIG. 18 and reflected on the second reflective portions RF3.

In contrast, most of the second polarized light POL2 of the light L incident on the second reflective element RD3 is made incident on the second transparent portions TP3, transmitted through the second reflective element RD3, made incident on the second liquid crystal element LD3, and converged by the second lens 503. Most of the second polarized light POL2 converged on the second lens 503 is made incident on the first transparent portions TP1 and transmitted through the first reflective element RD1. The second polarized light POL2 transmitted through the first reflective element RD1 is made incident on the first liquid crystal element LD1 and transmitted through the first liquid crystal element LD1. Part of the second polarized light POL2 converged by the second lens 503 is made incident on the first reflective portions RF1, reflected on the first reflective portions RF1, made incident on the second liquid crystal element LD3 again, transmitted through the second liquid crystal element LD3, made incident on the second transparent portions TP3 again, and transmitted through the second reflective element RD3 again.

In addition, part of the second polarized light POL2 of the light L incident on the second reflective element RD3 is made incident on the second reflective portions RF3 shown in FIG. 18 and reflected on the second reflective portions RF3.

Thus, the optical element 2 shown in FIG. 16 to FIG. 19 emits the reflected light on the reflective portions RF in addition to the incident light from the lower side. For this reason, when the optical element 2 is seen from the upper side, the optical element 2 seems bright by the incident light which is made incident from the lower side and the reflected light of the incident light which is made incident from the upper side.

In the configuration example of the fifth embodiment, too, the same advantages as those of the above-explained embodiments can be obtained.

Sixth Embodiment

FIG. 20 is a view showing a configuration example of an optical element 2 of an optical device OPD according to a sixth embodiment. The optical element 2 shown in FIG. 20 is different from the optical element 2 shown in FIG. 16 with respect to a structure of a reflective element.

In the example illustrated, the optical element 2 comprises a first liquid crystal element LD1, a second liquid crystal element LD2, and a reflective element RD4. In the optical element 2, the reflective element RD4, the second liquid crystal element LD2, and the first liquid crystal element LD1 are arranged in this order in the third direction Z. The first liquid crystal element LD1 is opposed to the second liquid crystal element LD3. The second liquid crystal element LD3 is located between the first liquid crystal element LD1 and the reflective element RD4. The reflective element RD4 is opposed to the second liquid crystal element LD3.

The reflective element RD4 comprises a reflective portion RF4 and a transparent portion TP4. The reflective portions RF4 are disposed in a grid shape on the reflective element RD4. In the example illustrated, the reflective portions RF4 are disposed in a grid shape on a substrate 61. The transparent portion TP4 is, for example, an area where the reflective portions RF4 are not disposed on the substrate 61. In the example illustrated, the transparent portions TP4 are constituted in a matrix. For example, first lenses 501 overlap the reflective element RD4 in the third direction Z. In addition, second lenses 503 overlap the reflective element RD4 in the third direction Z.

Thus, the optical element 2 shown in FIG. 20 reflects most of the light L incident from the upper side and urges most of the light L incident from the lower side to be transmitted. The optical element 2 can reflect first polarized light POL1 converged to the first liquid crystal element LD1 by the reflective portions RF4, and second polarized light POL2 converged to the second liquid crystal element LD3. For this reason, the optical element 2 can reflect the light incident from the upper side with a simple structure.

In the configuration example of the sixth embodiment, too, the same advantages as those of the above-explained embodiments can be obtained. In addition, the optical element OPD can reflect the light incident from the upper side with a simple structure.

Seventh Embodiment

Figure 21:
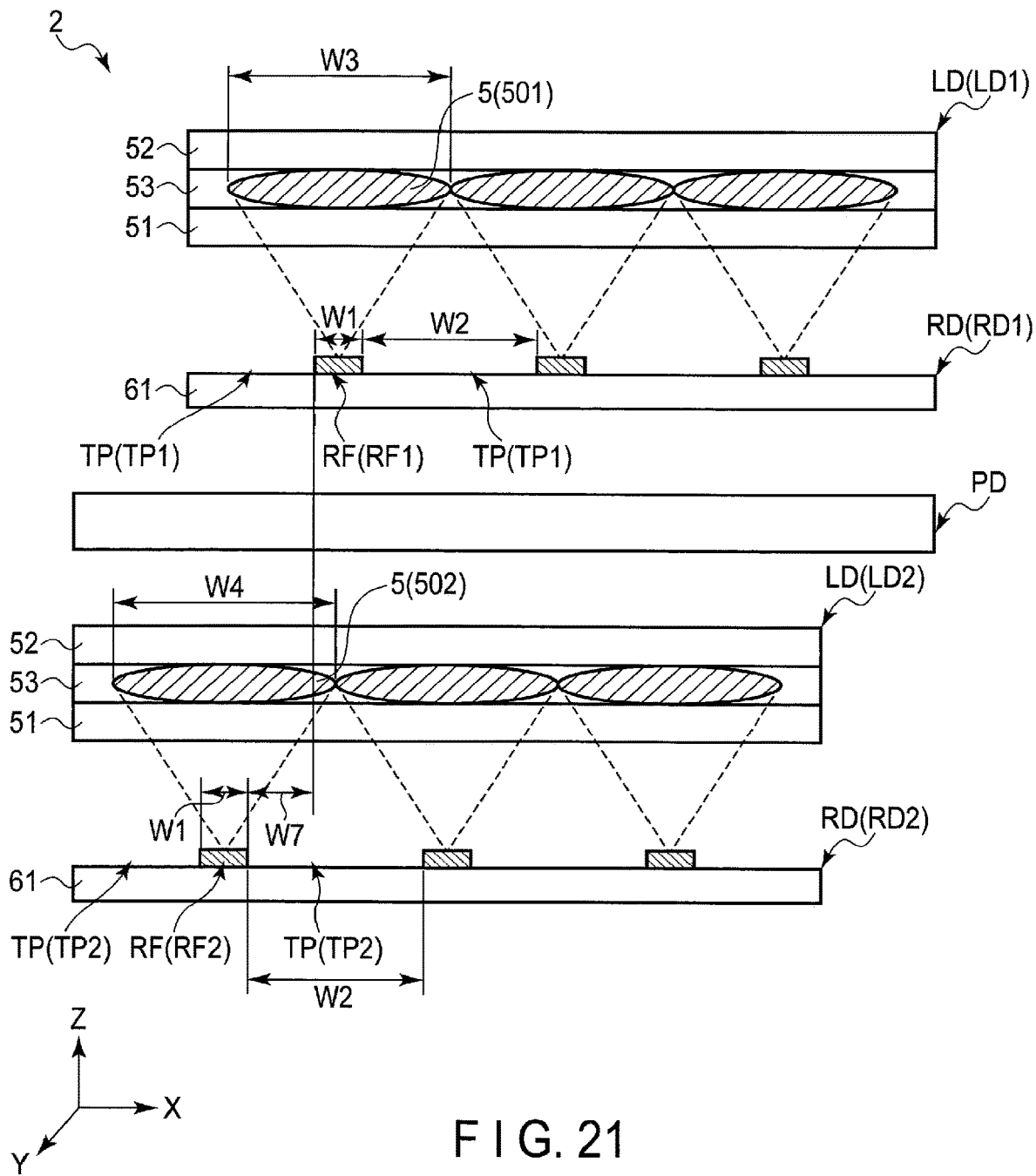
FIG. 21 is a view showing a configuration example of an optical element of an optical device according to a seventh embodiment.

FIG. 21 is a view showing a configuration example of an optical element 2 of an optical device OPD according to a seventh embodiment. The optical element 2 shown in FIG. 21 is different from the optical element 2 shown in FIG. 16 to FIG. 19 with respect to a feature of comprising a retardation film.

In the example illustrated, the optical element 2 comprises a first liquid crystal element LD1, a first reflective element RD1, a retardation film PD, a second liquid crystal element LD2, and a second reflective element RD2. In the optical element 2, the second reflective element RD2, the second liquid crystal element LD2, the retardation film PD, the first reflective element RD1, and the first liquid crystal element LD1 are arranged in this order in the third direction Z. The first liquid crystal element LD1 is opposed to the first reflective element RD1. The first liquid crystal element LD1 is located between the first liquid crystal element LD1 and the retardation film PD. The retardation film PD is located between the first liquid crystal element LD1 and the second liquid crystal element LD2. The second liquid crystal element LD2 is located between the retardation film PD and the second reflective element RD2. The second reflective element RD2 is opposed to the second liquid crystal element LD2.

The first liquid crystal element LD1 comprises first lenses 501 as explained above.

The first reflective element RD1 comprises first reflective portions RF1 and first transparent portions TP1 as explained above. The reflective portions RF1 and the first transparent portions TP1 are opposed to the lenses 501 in the third direction Z.

The retardation film PD is opposed to the reflective portions RF1 and the first transparent portions TP on a side opposite to the first lenses 501 in the third direction Z.

The second liquid crystal element LD2 comprises second lenses 502 as explained above. The second lenses 502 are opposed to the retardation film PD on a side opposite to the reflective portions RF1 and the first transparent portions TP1. In the example illustrated, the second liquid crystal element LD2 is displaced from the first liquid crystal element LD1 in the first direction X.

The second reflective element RD2 comprises second reflective portions RF2 and second transparent portions TP2. The second reflective element RD2 can employ the same configuration as the above-explained reflective element RD. For example, the second reflective portions RF2 is constituted by replacing the reflective portions RF of the above-explained reflective element RD with the second reflective portions RF2 and replacing the transparent portions TP with the second transparent portions TP2. For example, the second reflective portions RF2 can employ the same configuration as the reflective portions RF. In addition, the second transparent portions TP2 can employ the same configuration as the transparent portions TP. The second reflective portions RF2 and the second transparent portions TP2 extend in, for example, the second direction Y. For example, the second reflective portions RF2 and the second transparent portions TP2 are opposed to the second lenses 502 on a side opposite to the retardation film PD in the third direction Z. In the example illustrated, the second lenses 502 overlap the second reflective portions RF2 and the second transparent portions TP2 in the third direction Z. In the example illustrated, the second lenses 502 overlap the second reflective portions RF2 and the second transparent portions TP2 in the third direction Z.

In the example illustrated, the first reflective element RD1 is displaced from the second reflective element RD2 in the first direction X. For example, the first reflective element RD1 is displaced from the second reflective element RD2 by a gap W7, in the first direction X. For this reason, the first transparent portions TP1 overlap the second reflective portions RF2 in the third direction Z. In addition, the first reflective portions RF1 overlap the second transparent portions TP2 in the third direction Z. Part of the light incident from a lower side of the optical element 2 passes through the gap W7 and is transmitted toward the upper side of the optical element 2.

Thus, the optical element 2 shown in FIG. 20 converges and reflects first polarized light POL1 of the incident light which is made incident from the upper side, on the first reflective portions RF1, by the first lenses 501. In addition, the optical element 2 converges and reflects second polarized light POL2 of the incident light which is made incident from the upper side, on the second reflective portions RF2, by the second lenses 502. That is, the same advantages of the optical element 2 shown in FIG. 16 to FIG. 19 can be obtained from the optical element 2 shown in FIG. 20.

In the configuration example of the seventh embodiment, too, the same advantages as those of the above-explained embodiments can be obtained.

Eighth Embodiment

FIG. 22 is a view showing a configuration example of an optical element 2 of an optical device OPD according to an eighth embodiment. The optical element 2 shown in FIG. 22 is different from the optical element 2 shown in FIG. 12 with respect to a feature of comprising a light-shielding element.

In the example illustrated, the optical element 2 comprises a liquid crystal element LD and a light-shielding element SE. In the optical element 2, the light-shielding element SE and the liquid crystal element LD are arranged in this order in the third direction Z. The liquid crystal element LD is opposed to the light-shielding element SE.

The light-shielding element SE comprises light-shielding portions SD and transparent portions TP. The light-shielding element SE can employ the same configuration as the above-explained reflective element RD. For example, the light-shielding element SE is constituted by replacing the reflective portions RF of the above-explained reflective element RD with the light-shielding portions SD. The light-shielding portions SD block incident light. For example, the light-shielding portions SD are arranged in the first direction X and spaced apart, on the light-shielding element SE. The transparent portions TP are adjacent to the light-shielding portions SD in the first direction X. In the example illustrated, the light-shielding portions SD and the transparent portions TP are alternately arranged in the first direction X. The light-shielding portions SD and the transparent portions TP extend in, for example, the second direction Y. In addition, the light-shielding portions SD are disposed at positions where, for example, the light is converged by lenses 5. The light-shielding portions SD and the transparent portions TP are opposed to the lenses 5 in the third direction Z. For example, the lenses 5 overlap the light-shielding portions SD and the transparent portions TP in the third direction Z. The light-shielding portions SD and the transparent portion TP may be fixed to predetermined positions or may be constituted such that their positions are variable.

For example, a width W1 of the light-shielding portion SD in the first direction X is equal to the width W1 of the modulating portion MA shown in FIG. 1. For this reason, the width W1 of the light-shielding portion SD is smaller than the width W3 of the lens 5 and is also smaller than the width W2 of the transparent portion TP.

Thus, the optical element 2 shown in FIG. 22 converges and blocks first polarized light POL1 of the incident light L which is made incident from the upper side, to the light-shielding portions SD, by the lenses 5.

In contrast, most of second polarized light POL2 of the light L incident on the liquid crystal element LD is transmitted through the liquid crystal element LD, made incident on the transparent portions TP, and transmitted through the light-shielding element SE. Part of the second polarized light POL2 of the light L incident on the liquid crystal element LD is transmitted through the liquid crystal element LD and blocked by the light-shielding portions SD.

Next, an action of the optical element 2 in a case where the light L is made incident from the lower side in the third direction Z will be explained.

First, the light L is made incident on the light-shielding element SE. Most of the first polarized light POL1 of the light L incident on the light-shielding element SE is made incident on the transparent portions TP, transmitted through the light-shielding portions SD, made incident on the liquid crystal element LD, and converged by the lenses 5. Part of the first polarized light POL1 of the light L incident on the light-shielding element SE is blocked by the light-shielding portions SD.

In contrast, most of the second polarized light POL2 of the light L incident on the light-shielding element SE is made incident on the transparent portions TP, transmitted through the light-shielding element SE, made incident on the liquid crystal element LD, and transmitted through the liquid crystal element LD. Part of the second polarized light POL2 of the light L incident on the light-shielding element SE is blocked by the light-shielding portions SD.

Thus, the optical element 2 shown in FIG. 22 reflects substantially half part of the light L incident from the upper side and urges most of the light L incident from the lower side to be transmitted. For example, in the example shown in FIG. 22, the optical element 2 blocks most of the first polarized light POL1 of the light L incident from the upper side and urges most of the second polarized light POL2 to be transmitted. In the example shown in FIG. 22, the optical element 2 urges most of the first polarized light POL1 of the light L incident from the lower side to be transmitted and urges most of the second polarized light POL2 to be transmitted.

In the configuration example of the eighth embodiment, too, the same advantages as those of the above-explained embodiments can be obtained. The light-shielding element SE can employ the structures shown in FIG. 13 to FIG. 20.

Ninth Embodiment

FIG. 23 is a view showing a configuration example of a display device DSP according to a ninth embodiment.

The display device DSP comprises a display panel 1, an optical element 2, and a controller CT. The optical element 2 is the optical element 2 explained with reference to FIG. 1 to FIG. 22. The display panel 1 is, for example, a transparent display panel. For example, the display panel 1 is a self-luminous display panel comprising an organic electroluminescent display element or the like. The display panel 1 is opposed to the optical element 2. The controller CT comprises a display controller DOT and a light controller OCT. The display controller DCT is electrically connected to the display panel 1 to control the display panel 1. The display panel 1 side is referred to as front side FR and the optical element 2 side is referred to as a back side BK in the following explanations.

The display device DSP displays, for example, image DI on the display panel 1. If natural light L is emitted from a light source LS located on the back side BK of the display device DSP, the display device DSP controls incident light to be blocked in an area SR of the optical element 2 located on the back side BK of the display panel 1 displaying the image DI. In other words, the display device DSP controls the transmittance of the incident light on the area SR.

According to the ninth embodiment, the display device DSP enables the image DI displayed on the display panel 1 to be easily visible by controlling the incident light to be blocked by the optical element 2.

Examples of the display device which can be obtained from the configurations disclosed in the present specification will be explained below.

(1) An optical element, comprising:
a first liquid crystal lens formed of liquid crystal molecules;
a polarizer opposed to the first liquid crystal lens;
a first modulating portion located between the first liquid crystal lens and the polarizer to modulate incident light; and
a first unmodulating portion located between the first liquid crystal lens and the polarizer, and adjacent to the first modulating portion.

(2) The optical element according to (1), wherein
the first modulating portion and the first unmodulating portion are arranged in a first direction, and
a width of the first modulating portion in the first direction is smaller than a width of the first unmodulating portion in the first direction.

(3) The optical element according to (1) or (2), further comprising:
a first modulating element located between the first liquid crystal lens and the polarizer, and the first modulating element comprising the first modulating portion and the first unmodulating portion, wherein the first modulating element further comprises a first substrate, a second substrate, a liquid crystal layer held between the first substrate and the second substrate, and a first control electrode and a second control electrode applying voltages to the liquid crystal layer to form the first modulating portion and the first unmodulating portion.

(4) The optical element according to (1), further comprising:

a second liquid crystal lens opposed to the polarizer on a side opposite to the first liquid crystal lens, and formed of liquid crystal molecules;

a second modulating portion located between the polarizer and the second liquid crystal lens to modulate incident light; and a second unmodulating portion located between the polarizer and the second liquid crystal lens, and adjacent to the second modulating portion.

(5) The optical element according to (4), wherein the second modulating portion and the second unmodulating portion are arranged in a first direction, and a width of the second modulating portion in the first direction is larger than a width of the second unmodulating portion in the first direction.

(6) The optical element according to (5), wherein the width of the second unmodulating portion in the first direction is smaller than the width of the first modulating portion in the first direction.

(7) The optical element according to (4), further comprising:

a second modulating element located between the second liquid crystal lens and the polarizer, and the second modulating element comprising the second modulating portion and the second unmodulating portion; and a controller electrically controlling the first modulating element and the second modulating element, wherein the controller changes positions of formation of the first modulating portion and the first unmodulating portion, and changes positions of formation of the second modulating portion and the second unmodulating portion.

(8) The optical element according to (5) or (6), wherein each of the first liquid crystal lens, the first modulating portion, the second unmodulating portion, and the second liquid crystal lens extends in a second direction intersecting the first direction, the first modulating portion and the second unmodulating portion overlap in a third direction which intersects the first direction and the second direction, and the first unmodulating portion and the second modulating portion overlap in the third direction.

(9) An optical element, comprising:

a first liquid crystal lens formed of liquid crystal molecules;

a first reflective portion opposed to the first liquid crystal lens and reflecting incident light; and a first transmissive portion opposed to the first liquid crystal lens and adjacent to the first reflective portion, wherein the first reflective portion and the first transmissive portion are arranged in a first direction, and a width of the first reflective portion in the first direction is smaller than a width of the first transmissive portion in the first direction.

(10) The optical element according to (9), further comprising:

a second liquid crystal lens located between the first liquid crystal lens and the first reflective portion, and formed of liquid crystal molecules; and a retardation film located between the first liquid crystal lens and the second liquid crystal lens.

(11) The optical element according to (10), wherein each of the first liquid crystal lens, the first reflective portion, the first transmissive portion, and the second liquid crystal lens extends in a second direction intersecting the first direction, and the first liquid crystal lens, the first reflective portion, the first transmissive portion, and the second liquid crystal lens overlap in a third direction which intersects the first direction and the second direction.

(12) The optical element according to (11), wherein a first focal distance between the first liquid crystal lens and the first reflective portion is larger than a second focal distance between the second liquid crystal lens and the first reflective portion.

(13) The optical element according to (9), further comprising:

a second liquid crystal lens opposed to the first reflective portion and the first transmissive portion on a side opposite to the first liquid crystal lens, and formed of liquid crystal molecules;

a second reflective portion opposed to the second liquid crystal lens on a side opposite to the first reflective portion and the first transmissive portion, and reflecting incident light; and a second transmissive portion opposed to the second liquid crystal lens on the side opposite to the first reflective portion and the first transmissive portion, and adjacent to the second reflective portion, wherein the first liquid crystal lens and the first reflective portion extend in a second direction intersecting the first direction, and the second liquid crystal lens and the second reflective portion extend in the first direction.

(14) The optical element according to (9), further comprising:

a retardation film opposed to the first reflective portion and the first transmissive portion on a side opposite to the first liquid crystal lens;

a second liquid crystal lens opposed to the retardation film on a side opposite to the first reflective portion and the first transmissive portion, and formed of liquid crystal molecules;

a second reflective portion opposed to the second liquid crystal lens on a side opposite to the retardation film, and reflecting incident light; and a second transmissive portion opposed to the second liquid crystal lens on the side opposite to the retardation film, and adjacent to the second reflective portion, wherein the first liquid crystal lens, the first reflective portion, the first transmissive portion, the second liquid crystal lens, the second reflective portion, and the second transmissive portion extend in a second direction intersecting the first direction, the first reflective portion and the second transmissive portion overlap in a third direction intersecting the second direction, and the first transmissive portion and the second reflective portion overlap in the third direction.

(15) The optical element according to (14), wherein a width of the second reflective portion in the first direction is smaller than a width of the second transmissive portion in the first direction.

(16) The optical element according to (15), wherein the first liquid crystal lens and the second liquid crystal lens are displaced in the first direction.

(17) The optical element according to (9), further comprising:

a second liquid crystal lens located between the first liquid crystal lens and the first reflective portion and first transmissive portion, and formed of liquid crystal molecules, wherein the first reflective portion is disposed in a grid shape in planar view, the first liquid crystal lens extends in a second direction intersecting the first direction, and the second liquid crystal lens extends in the first direction.

(18) The optical element according to (17), wherein the first transmissive portions are located between the first reflective portions, and arrayed in matrix.

(19) An optical element, comprising:

a liquid crystal lens formed of liquid crystal molecules;

a light-shielding portion opposed to the liquid crystal lens and blocking incident light; and a transmissive portion opposed to the liquid crystal lens and adjacent to the light-shielding portion, wherein the light-shielding portion and the transmissive portion are arranged in a first direction, and a width of the light-shielding portion in the first direction is smaller than a width of the transmissive portion in the first direction.

(20) The optical element according to (19), wherein a width of the light-shielding portion in the first direction is smaller than a width of the liquid crystal lens in the first direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical element, comprising:
   a first liquid crystal lens formed of liquid crystal molecules, and functioning as a convex lens having a refractive index distribution corresponding to an aligned state of the liquid crystal molecules;
   a polarizer;
   a first modulating portion located between the first liquid crystal lens and the polarizer, and transmitting incident light while rotating a polarization plane; and
   a first unmodulating portion adjacent to the first modulating portion between the first liquid crystal lens and the polarizer in a first direction, and transmitting incident light,
   the first liquid crystal lens, the first modulating portion, the first unmodulating portion, and the polarizer being arranged in this order in a second direction intersecting the first direction,
   the first liquid crystal lens, the first modulating portion, and the first unmodulating portion being opposed to each other in the second direction,
   the first modulating portion, the first unmodulating portion, and the polarizer being opposed to each other in the second direction.

2. The optical element according to claim 1, wherein a width of the first modulating portion in the first direction is smaller than a width of the first unmodulating portion in the first direction.

3. The optical element according to claim 1, further comprising:
   a first modulating element located between the first liquid crystal lens and the polarizer, and the first modulating element comprising the first modulating portion and the first unmodulating portion,
   wherein
   the first modulating element further comprises a first substrate, a second substrate, a liquid crystal layer held between the first substrate and the second substrate, and a first control electrode and a second control electrode applying voltages to the liquid crystal layer to form the first modulating portion and the first unmodulating portion.

4. The optical element according to claim 1, further comprising:
   a second liquid crystal lens located on a side opposite to the first liquid crystal lens with respect to the polarizer, formed of liquid crystal molecules, and functioning as a convex lens having a refractive index distribution corresponding to an aligned state of the liquid crystal molecules;
   a second modulating portion located between the polarizer and the second liquid crystal lens, and transmitting incident light while rotating a polarization plane; and
   a second unmodulating portion adjacent to the second modulating portion between the polarizer and the second liquid crystal lens in the second direction, and transmitting incident light,
   wherein
   the polarizer, the second modulating portion, the second unmodulating portion, and the second liquid crystal lens are arranged in this order in the second direction,
   the second liquid crystal lens, the second modulating portion, and the second unmodulating portion are opposed to each other in the second direction, and
   the second modulating portion, the second unmodulating portion, and the polarizer are opposed to each other in the second direction.

5. The optical element according to claim 4, wherein a width of the second modulating portion in the first direction is larger than a width of the second unmodulating portion in the first direction.

6. The optical element according to claim 5, wherein the width of the second unmodulating portion in the first direction is smaller than the width of the first modulating portion in the first direction.

7. The optical element according to claim 4, further comprising:
   a second modulating element located between the second liquid crystal lens and the polarizer, and the second modulating element comprising the second modulating portion and the second unmodulating portion; and
   a controller electrically controlling the first modulating element and the second modulating element, wherein
the controller changes positions of formation of the first modulating portion and the first unmodulating portion, and changes positions of formation of the second modulating portion and the second unmodulating portion.

8. The optical element according to claim 5, wherein
each of the first liquid crystal lens, the first modulating portion, the second unmodulating portion, and the second liquid crystal lens extends in a third direction intersecting the first direction and the second direction,
the first modulating portion and the second unmodulating portion overlap in the second direction, and
the first unmodulating portion and the second modulating portion overlap in the second direction.

* * * * *